US011441348B2

(12) United States Patent
Eom et al.

(10) Patent No.: US 11,441,348 B2
(45) Date of Patent: *Sep. 13, 2022

(54) REFRIGERATOR AND CONTROL METHOD THEREOF

(71) Applicant: SAMSUNG ELECTRONICS CO., LTD., Suwon-si (KR)

(72) Inventors: Tae-In Eom, Hwaseong-si (KR); Young Kyun Jeong, Suwon-si (KR); Chan Young Park, Suwon-si (KR); Hyun Uk Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/141,789

(22) Filed: Jan. 5, 2021

(65) Prior Publication Data
US 2021/0156187 A1 May 27, 2021

Related U.S. Application Data

(63) Continuation of application No. 15/923,391, filed on Mar. 16, 2018, now Pat. No. 10,900,271.

(30) Foreign Application Priority Data
May 17, 2017 (KR) .................. 10-2017-0061106

(51) Int. Cl.
E06B 3/00 (2006.01)
E05F 15/73 (2015.01)
(Continued)

(52) U.S. Cl.
CPC ............ E05F 15/73 (2015.01); E05F 15/614 (2015.01); F25D 23/028 (2013.01);
(Continued)

(58) Field of Classification Search
CPC ............ F25D 29/005; F25D 2323/024; F25D 2323/021; F25D 2700/02; F25D 23/028;
(Continued)

(56) References Cited

U.S. PATENT DOCUMENTS 10,260,797 B2 ‡ 4/2019 Kim .......................... H02P 6/16
10,638,858 B2 * 5/2020 Kim ........................ F25D 23/02
(Continued)

FOREIGN PATENT DOCUMENTS

JP 2005-120697 5/2005
JP 2005-120697 A 5/2005
(Continued)

OTHER PUBLICATIONS

Office Action issued from the Korean Patent Office in Korean Application No. 9-5-2021-049815130 dated Jun. 24, 2021.
(Continued)

Primary Examiner — Chi Q Nguyen
(74) Attorney, Agent, or Firm — Staas & Halsey LLP

(57) ABSTRACT

A refrigerator and a method for controlling the same are disclosed, which may automatically open or close a door and a method for controlling the same. The refrigerator may automatically open or close door(s) of the refrigerator by controlling a motor. After lapse of a predetermined time after the door of the refrigerator has been closed, the refrigerator operates a motor with an output used when the door is not opened, such that the refrigerator may remove noise while simultaneously maintaining a constant door opening time when the door is opened. In addition, when the door opening signal time is detected, the refrigerator may immediately opens the door.

12 Claims, 19 Drawing Sheets

(51) Int. Cl.
*F25D 23/02* (2006.01)
*E05F 15/614* (2015.01)
*F25D 29/00* (2006.01)
*F16H 19/08* (2006.01)

(52) U.S. Cl.
CPC ........ *F25D 29/005* (2013.01); *E05Y 2201/43* (2013.01); *E05Y 2201/72* (2013.01); *E05Y 2400/35* (2013.01); *E05Y 2400/415* (2013.01); *E05Y 2400/82* (2013.01); *E05Y 2400/858* (2013.01); *E05Y 2900/31* (2013.01); *F16H 19/08* (2013.01); *F25D 2323/021* (2013.01); *F25D 2323/024* (2013.01); *F25D 2700/02* (2013.01)

(58) Field of Classification Search
CPC ............. F25D 2700/00; E05Y 2900/31; E05Y 2201/72; E05Y 2400/41; E05Y 2400/415; E05Y 2400/35; E05Y 2400/858; E05Y 2201/43; F25C 1/24; F25C 1/18; F16H 19/08; E05F 15/614; E05F 15/73
USPC ............................. 49/506, 405, 404; 96/397
See application file for complete search history.

(56) References Cited

U.S. PATENT DOCUMENTS

| | | | | |
|---|---|---|---|---|
| 10,900,271 | B2* | 1/2021 | Eom | F25D 29/005 |
| 10,901,547 | B2* | 1/2021 | Park | G06F 3/0414 |
| 2002/0197169 | A1‡ | 12/2002 | Ahn | F04B 39/0055 |
| | | | | 417/22 |
| 2008/0156005 | A1* | 7/2008 | Culley | F25C 5/22 |
| | | | | 221/13 |
| 2009/0322470 | A1* | 12/2009 | Yoo | A47B 88/457 |
| | | | | 340/3.1 |
| 2014/0293060 | A1‡ | 10/2014 | Ryu | G06T 11/60 |
| | | | | 348/159 |
| 2015/0027148 | A1* | 1/2015 | Chung | F25D 11/022 |
| | | | | 62/126 |
| 2016/0003519 | A1* | 1/2016 | Kim | F25D 29/005 |
| | | | | 49/70 |
| 2016/0178277 | A1* | 6/2016 | Park | G06F 3/0416 |
| | | | | 345/173 |
| 2017/0097185 | A1‡ | 4/2017 | Yasaka | F25D 23/028 |
| 2017/0292748 | A1* | 10/2017 | Gullett | F25C 1/147 |
| 2018/0128537 | A1‡ | 5/2018 | Kim | E05F 15/635 |
| 2018/0238600 | A1‡ | 8/2018 | Lee | F25C 5/22 |
| 2018/0335252 | A1* | 11/2018 | Oh | G06V 20/52 |
| 2019/0086136 | A1* | 3/2019 | Lee | F25C 5/08 |
| 2019/0086141 | A1‡ | 3/2019 | Kim | B21D 5/00 |
| 2020/0095818 | A1‡ | 3/2020 | Lee | F25D 29/00 |

FOREIGN PATENT DOCUMENTS

| | | | |
|---|---|---|---|
| JP | 2006-329553 | | 12/2006 |
| JP | 2006-329553 A | | 12/2006 |
| JP | 2015-166664 | ‡ | 9/2015 |
| KR | 2000-0021976 | | 4/2000 |
| KR | 2001-0021304 | | 3/2001 |
| KR | 10-2006-0109586 | | 10/2006 |
| KR | 10-2007-0041002 | ‡ | 4/2007 |
| KR | 10-0740800 | | 7/2007 |
| KR | 20-2009-0000915 | | 2/2009 |
| KR | 10-2011-0040030 | ‡ | 4/2011 |
| KR | 10-1578354 | ‡ | 12/2015 |

OTHER PUBLICATIONS

Korean Notice of Allowance from Korean Application No. 10-2017-0061106 dated Aug. 27, 2021; 2 pages, 1 page English translation.
European Search Report issued in EP Application No. 18164639.9 dated Sep. 26, 2018 (9 total pages).
Chinese Office Action dated Mar. 23, 2020, in corresponding Chinese Patent Application No. 201810476747.2.
Office Action dated Feb. 24, 2020, in related U.S. Appl. No. 15/923,391.
Office Action dated May 27, 2020, in related U.S. Appl. No. 15/923,391.
Notice of Allowance dated Sep. 25, 2020, in related U.S. Appl. No. 15/923,391.
U.S. Appl. No. 15/923,391, filed Mar. 16, 2018, Tae-In Eom et al., Samsung Electronics Co., Ltd.

\* cited by examiner
‡ imported from a related application

REFRIGERATOR AND CONTROL METHOD THEREOF

CROSS-REFERENCE TO RELATED APPLICATION

This application is a continuation application of U.S. patent application Ser. No. 15/923,391, filed on Mar. 16, 2018, which claims the benefit of the Korean Patent Application No. 10-2017-0061106, filed on May 17, 2017, in the Korean Intellectual Property Office, the disclosures of which are incorporated herein by reference.

BACKGROUND

1. Field

Embodiments of the present disclosure relate to a refrigerator for automatically opening or closing doors and a method for controlling the same.

2. Description of the Related Art

Generally, a refrigerator is an apparatus to store food in a fresh state for a long time by supplying cool air to a storage chamber storing the food. A temperature of the storage chamber is maintained within a predetermined range needed to store food in the fresh state.

The storage chamber of the refrigerator has an opened front surface, and the opened front surface is closed by door(s).

The door may be directly closed or opened by a user. However, the user may have difficulty in freely using his or her hands in some cases, for example, when putting food in the storage chamber or taking food from the storage chamber. In this case, the user must open or close the doors of the refrigerator after putting food on other places such as a dining table, resulting in user inconvenience. In order to address the user inconvenience, advanced refrigerators capable of automatically opening or closing doors thereof have recently been developed and introduced to the market.

SUMMARY

Therefore, it is an aspect of the present disclosure to provide a refrigerator for automatically opening or closing doors by controlling a motor, and a method for controlling the same.

It is another aspect of the present disclosure to provide a refrigerator which operates a motor with an output power used when the door is not opened, after lapse of a constant time after the door of the refrigerator has been closed, such that the refrigerator can remove noise while simultaneously maintaining a constant door opening time when the door is opened, and a method for controlling the same.

It is another aspect of the present disclosure to provide a refrigerator capable of immediately opening a door as soon as a door opening signal is detected, and a method for controlling the same.

Additional aspects of the invention will be set forth in part in the description which follows and, in part, will be apparent from the description, or may be learned by practice of the invention.

In accordance with one aspect of the present disclosure, a refrigerator includes: a main body forming an exterior appearance of the refrigerator, and the main body including a storage chamber therein and a hinge shaft installed therein; a door pivotably hinged to the main body with respect to the hinge shaft in a manner that the storage chamber is opened or closed; a door opening and closing device configured to open or close the door; a door opening and closing sensing portion configured to detect whether the door is opened or closed; and a controller configured to control the door opening and closing device. The door opening and closing device includes: a motor configured to generate a rotational force; a first gear configured to rotate by interacting with the motor; and a second gear configured to transfer the rotational force generated by the motor to the hinge shaft. The controller stores a first output value of the motor so as to open the door, and operates the motor at a second output value which is less than the first output value when the door is closed such that the door moves to an open position.

The controller may operate the motor in a manner that the door moves from a close position to the open position and the rotational force is transmitted from the first gear to the second gear.

The controller may count a closed time of the door, and may operate the motor to rotate the first gear in a forward direction after lapse of a predetermined time, such that the door moves to an open position.

The second output value may be a motor control value to operate the motor to rotate the first gear in a forward direction with an output used when the door is not opened.

The controller may count an operation time of the motor, and may stop a forward rotation of the first gear after lapse of a predetermined time.

The controller may open the door by a forward rotation of the first gear by operating the motor when a door open signal is detected by the door opening and closing sensing portion.

In accordance with another aspect of the present disclosure, a refrigerator includes: a main body forming an exterior appearance of the refrigerator, and the main body including a storage chamber therein and a hinge shaft installed therein; a door pivotably hinged to the main body with respect to the hinge shaft in a manner that the storage chamber is opened or closed; a door opening and closing device configured to open or close the door; a door opening and closing sensing portion configured to detect whether the door is opened or closed; and a controller configured to control the door opening and closing device in a manner that the door moves from a close position to an open position. The door opening and closing device includes: a motor configured to generate a rotational force; a first gear configured to rotate by interacting with the motor; and a second gear configured to transfer the rotational force to the hinge shaft. The controller stores a first output value of the motor so as to open the door, and operates the motor at a second output value which is less than the first output value such that rotational force is transmitted from the first gear to the second gear.

The controller may count a closed time of the door, and may rotate the first gear by operating the motor in a forward direction after lapse of a predetermined time, such that the door moves to an open position.

The second output value may be a motor control value used to operate the motor to rotate in a forward direction with an output used when the door is not opened.

The controller may count an operation time of the motor, and may stop a forward rotation of the first gear after lapse of a predetermined time.

In accordance with another aspect of the present disclosure, a method for controlling a refrigerator which includes a main body forming an exterior appearance of the refrigerator, and the main body including a storage chamber therein and a hinge shaft installed therein; a door pivotably hinged to the main body with respect to a hinge shaft in a manner that the storage chamber is opened or closed; and a motor configured to generate a rotational force so as to open or close the door, includes: determining whether the door is closed; counting a closed time of the door when the door is closed; determining whether the counted door close time is longer than a first time; and when determining that the door close time is longer than the first time, moving the door to an open position by operating the motor at a second output value which is less than a first output value of the motor needed to open the door.

The door movement to the open position may include rotating the first gear in a forward direction in a manner that the door moves from a close position to the open position and the rotational force is transmitted from the first gear to the second gear.

The method may further include: counting an operation time of the door; determining whether the counted motor operation time is longer than a second time; and when determining that the counted motor operation time is longer than the second time, stopping a forward rotation of the first gear.

The method may further comprise determining whether a door open signal is detected; and when determining that the door open signal is detected, opening the door through a forward rotation of the first gear.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
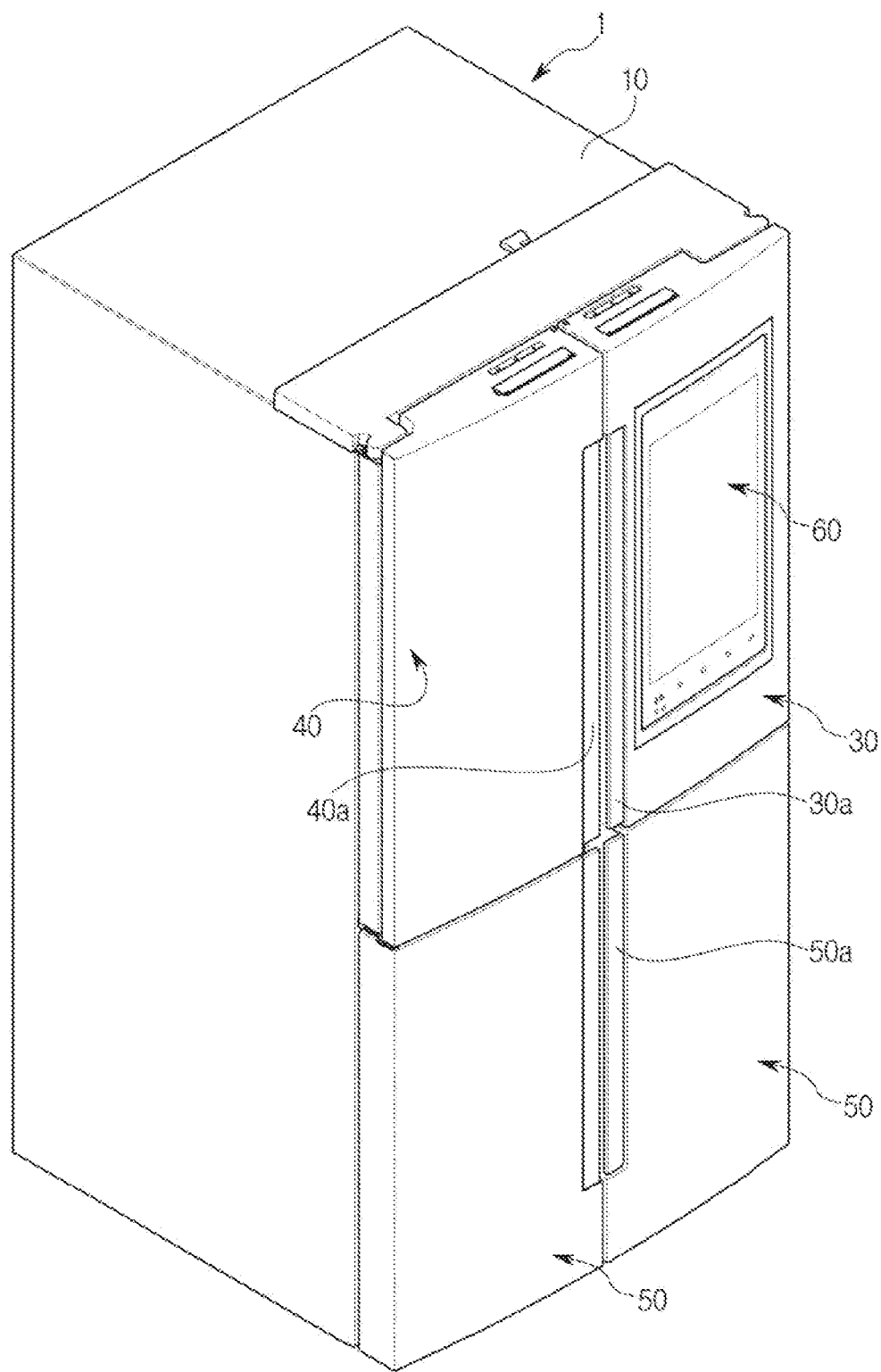
FIG. 1 is a perspective view illustrating a door close state of a refrigerator according to an embodiment of the present disclosure.

Reference will now be made in detail to the embodiments of the present disclosure, examples of which are illustrated in the accompanying drawings, wherein like reference numerals refer to like elements throughout.

The terms used in the present application are merely used to describe specific embodiments and are not intended to limit the present disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure. The term "and/or" may include a combination of a plurality of items or any one of a plurality of items.

A refrigerator and a method for controlling the same according to embodiments of the present disclosure will hereinafter be described with reference to the attached drawings.

Refrigerators may be broadly classified into a side-by-side type refrigerator, a bottom freezer type refrigerator, and a top mount type refrigerator. In the side-by-side type refrigerator, the freezing chamber and the refrigerating chamber are arranged side by side. In the bottom freezer type refrigerator, the freezing chamber is arranged under the refrigerating chamber. In the top mount type refrigerator, the freezing chamber is arranged above the refrigerating chamber. Although the refrigerator according to embodiments is exemplarily implemented as the side-by-side type refrigerator for convenience of description and better understanding of the present disclosure, the scope or spirit of the present disclosure is not limited thereto, and the embodiments can also be applied to the bottom freezer type refrigerator, the top mount type refrigerator, and a combination thereof.

In addition, the embodiments of the present disclosure can also be applied not only to a refrigerator in which an ice making chamber is provided at the refrigerating chamber but also to the other refrigerator in which the ice making chamber is provided at the freezing chamber, without departing from the scope or spirit of the present disclosure.

Figure 2:
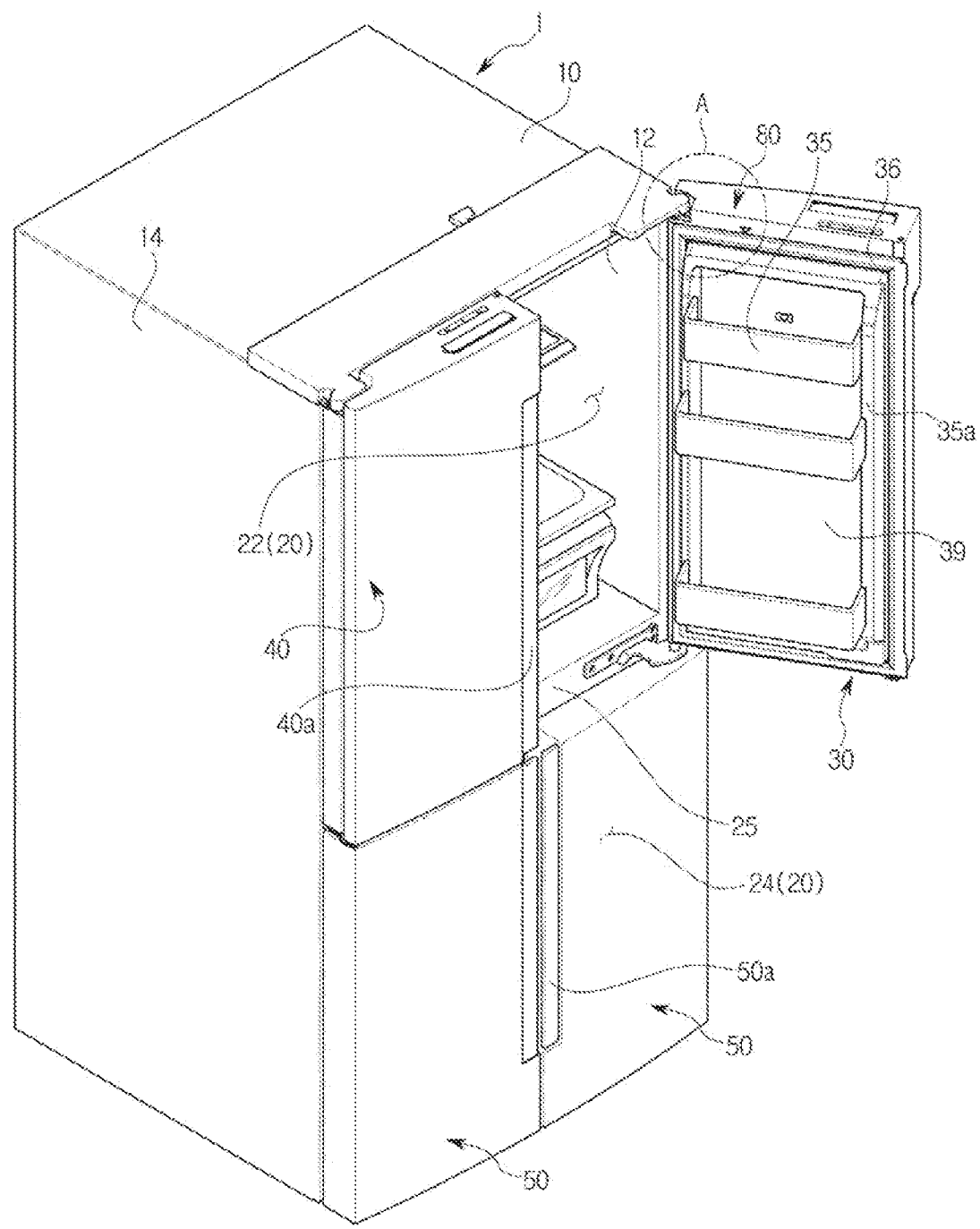
FIG. 2 is a perspective view illustrating an open state of some doors of a refrigerator according to an embodiment of the present disclosure.

FIG. 1 is a perspective view illustrating a door close state of a refrigerator according to an embodiment of the present disclosure. FIG. 2 is a perspective view illustrating an open state of some doors of the refrigerator according to an embodiment of the present disclosure.

Referring to FIGS. 1 and 2, a refrigerator 1 according to an embodiment may include a box-shaped main body 10 forming the external appearance thereof, a storage chamber 20 formed in the main body 10 while being divided into upper and lower storage chambers, doors 30 configured to open or close the storage chamber 20, and a cooling device 260 (see FIG. 17) configured to provide the storage chamber 20 with cool air.

The main body 10 may include an inner casing 11 to form the storage chamber 20, an outer casing 14 coupled to the exterior of the inner casing 11 so as to form the exterior appearance of the refrigerator, and insulation (not shown) foamed between the inner casing 12 and the outer casing 14 so as to prevent leakage of cool air from the storage chamber.

A front surface of the storage chamber 20 may be open, and the storage chamber 20 may be classified into an upper storage chamber 22 (i.e., a refrigerating chamber) and a lower storage chamber 24 (i.e., a freezing chamber) by a horizontal partition 25. The refrigerating chamber 22 may be opened or closed by one pair of doors 30 and 40 rotatably coupled to the main body 10, and the freezing chamber 24 may also be opened or closed by one pair of doors 50 rotatably coupled to the main body 10. The scope and spirit of the doors 30, 40 and 50 are not limited to the above shapes, and the doors 30, 40, and 50 may also be implemented as sliding doors configured to be slidably opened or closed.

The doors 30 and 40 for opening or closing the refrigerating chamber 22 may be arranged at right and left sides, respectively. For convenience of description, the right door 30 will hereinafter be referred to as a first door 30, and the left door 40 will hereinafter be referred to as a second door 40. In accordance with the relationship between the doors 50 of the freezing chamber 424 and the doors 30 and 40 of the refrigerating chamber 22, the doors 30 and 40 of the refrigerating chamber 22 will hereinafter be referred to as upper doors 30 and 40, and the doors 50 of the freezing chamber 24 will hereinafter be referred to as lower doors 50. The first door 30 may include a first door knob 30a to be grasped by a user in a manner that the first door 30 can be opened or closed, and the second door 40 may include a second door knob 40a to be grasped by a user in a manner that the second door 40 can be opened or closed. Each of the lower doors 50 may include a lower door knob 50a to be grasped by a user in a manner that the lower doors 50 can be opened or closed.

Figure 3:
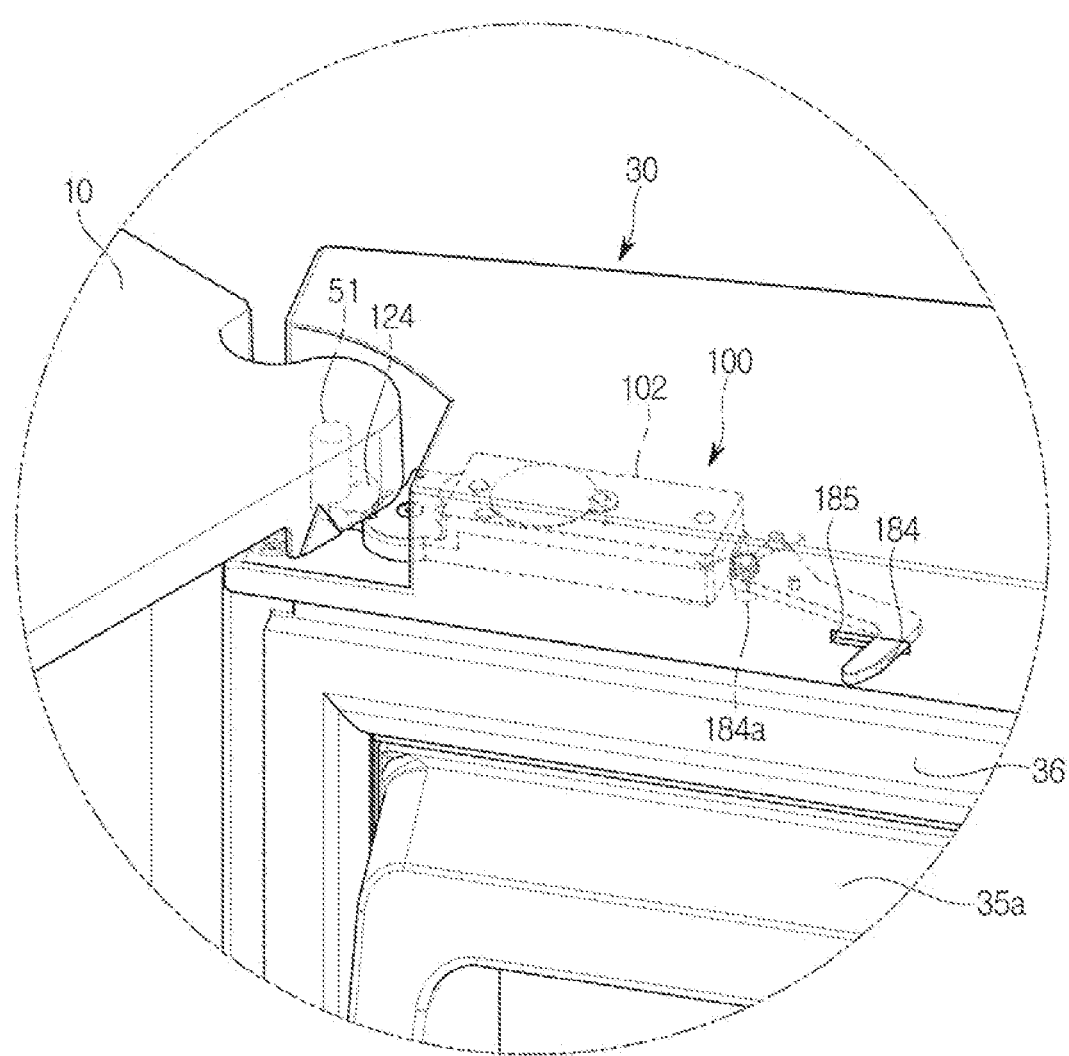
FIG. 3 is an enlarged view illustrating a region "A" shown in FIG. 2.

The doors 30, 40 and 50 may be pivotably hinged to the main body 10 with respect to a hinge shaft 50 (see FIG. 3).

The first door 30 may open or close some parts of the right side of the refrigerating chamber 22. The second door 40 may open or close the remaining parts of the refrigerating chamber 22. Each of the first door 30 and the second door 40 may include plural shelves 35 on which foods are placed. The shelves 35 may be provided at back surfaces of each door 30 or 40.

Each of the door shelves 35 may include a shelf support portion 35a vertically elongated from the first or second door 30 or 40 so as to support the door shelves 35 at left and right sides of the door shelves 35. The shelf support portion 35a may be configured independently, and may be detachably coupled to each of the doors 30 and 40. In the embodiment, the door shelves 35 may be elongated from the doors 30 and 40.

In addition, a gasket 36, configured to seal the spacing between the main body 10 and each of the first and second doors 30 and 40 when the first door 30 and the second door 40 are closed, is mounted to a border of a back surface of each of the first and second doors 30 and 40.

The gasket 36 may be installed in the form of a roof along the borders of back surfaces of the first door 30 and the second door 40, and may include a magnet (not shown).

Meanwhile, the spacing (gap) between the first door 30 and the second door 40 may occur on the condition that the first door 30 and the second door 40 are closed, and a bar assembly (not shown) may be provided to seal the spacing.

The refrigerator 1 may include a display device 60 having input/output (I/O) functions. The display device 60 may be provided at a front surface of the door 30 for convenience of description.

The display device 60 may interact with a user. For example, the display device 60 may receive a user input from the user, and may display operational information corresponding to the received user input.

The display device 60 may include a touch panel and a display panel. The touch panel may recognize coordinates of a portion contacting a part of a body of the user, and may receive operation instructions input by the user based on the recognized coordinates. The display panel may display various kinds of information according to a user's touch input.

The touch panel may be provided at a front surface of the display panel, and may be formed of a transparent material configured not to distort images displayed on the display panel. In addition, the touch panel may detect the presence or absence of contact of a part of the user body, and may also detect touch input coordinates contacting the part of the user body.

As the touch panel, a capacitive touch panel which recognizes coordinates of a portion contacting a part of the user body through change of capacitance due to contact with the part of the user body, or a resistive touch panel which recognizes coordinates of a portion contacting a part of the user body through change of electrical resistance (pressure) due to contact with the part of the user body may be employed. In addition, the scope and spirit of the touch panel are not limited thereto, and the touch panel may also be implemented as any of various kinds of input portions, which are capable of detecting user's touch or approach and outputting an electrical signal corresponding to coordinates of the detected touch point or coordinates of the approach point.

The display panel may display a user command entered by the user, and may display various kinds of information according to the user's touch input. For example, the display panel may display information as to whether the refrigerator 2 operates, information about operational information (e.g., a temperature of the storage chamber 20) of the refrigerator 1, and may also display daily information such as weather, time, or the like.

The display panel may be implemented as any of a cathode ray tube (CRT) display, a liquid crystal display (LCD) panel, a light emitting diode (LED) display panel, an organic light emitting diode (OLED) display panel, a plasma display panel (PDP), a field emission display (FED) panel, etc. without being limited thereto. The display panel may include various display means configured to visually display optical images corresponding to image data.

The display device 60 may include a wake-up function that is automatically activated when the user approaches within a predetermined range. For example, when the user approaches within the predetermined range, the display device 60 may be activated. In other words, the display device 60 may be turned on. In contrast, when the user exits the predetermined range, the display device 60 may be deactivated. That is, the display device 60 may be turned off.

Besides, the display device 60 may display various screens or images thereon.

Figure 4:
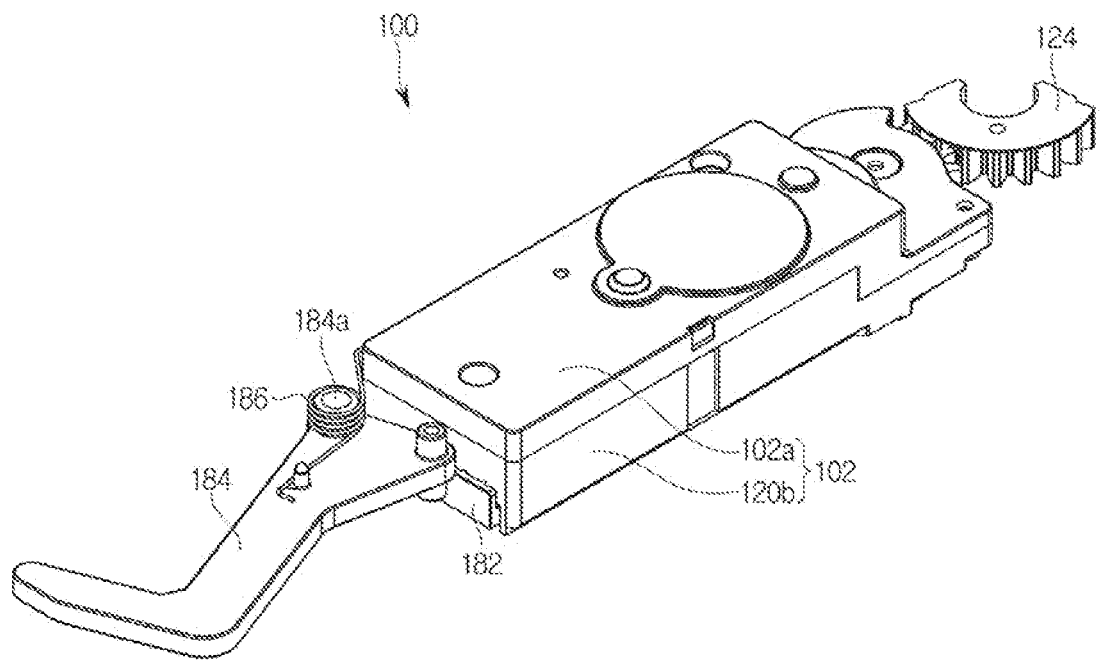
FIG. 4 is a perspective view illustrating a door opening and closing device of a refrigerator according to an embodiment of the present disclosure.
Figure 5:
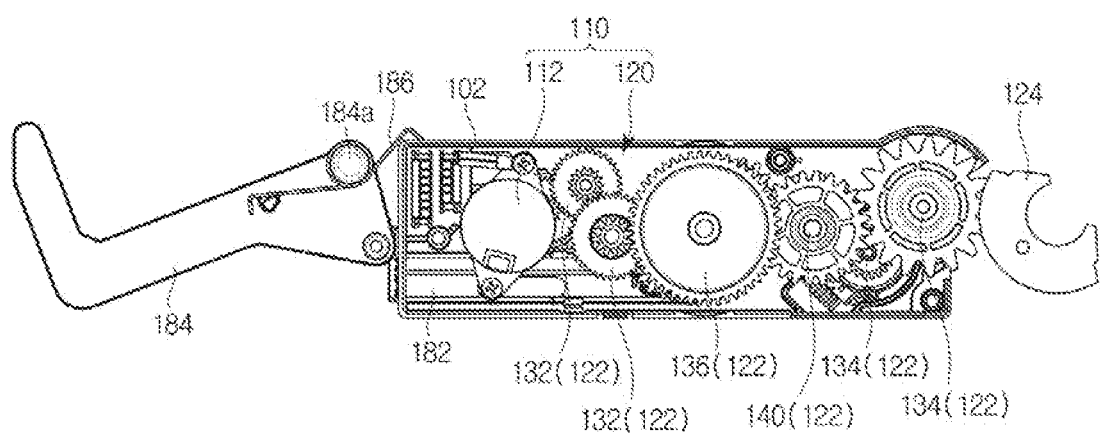
FIG. 5 is a top view illustrating an inner space of a door opening and closing device of a refrigerator according to an embodiment of the present disclosure.
Figure 6:
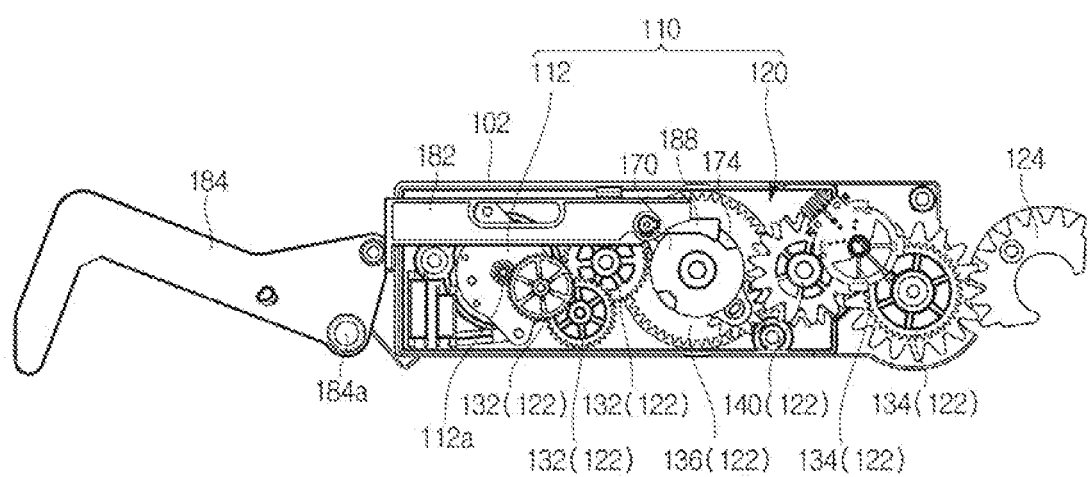
FIG. 6 is a bottom view illustrating an inner space of a door opening and closing device of a refrigerator according to an embodiment of the present disclosure.
Figure 7:
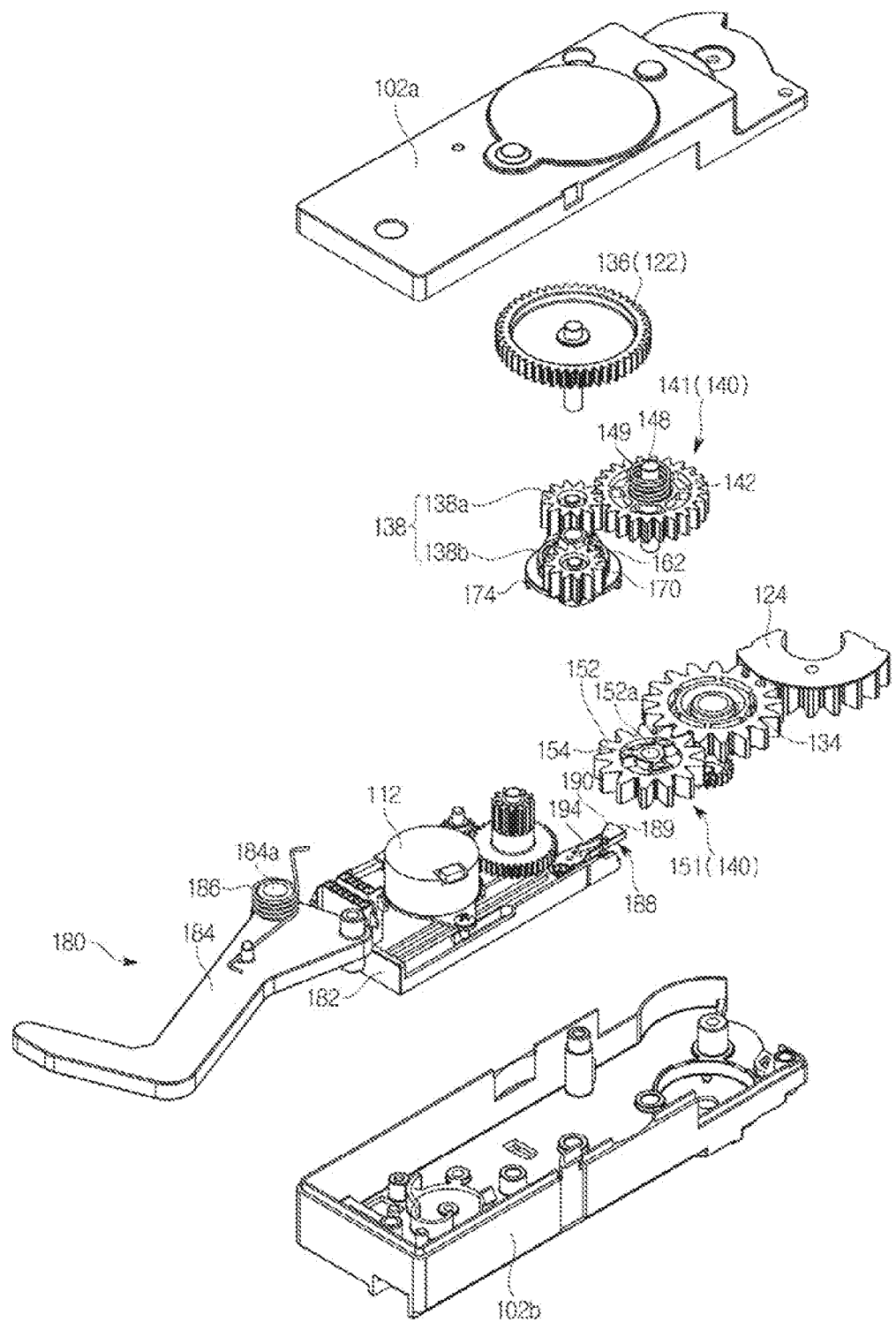
FIG. 7 is an exploded perspective view illustrating a door opening and closing device of a refrigerator according to an embodiment of the present disclosure.

FIG. 3 is an enlarged view illustrating a region "A" shown in FIG. 2. FIG. 4 is a perspective view illustrating a door opening and closing device of the refrigerator according to an embodiment of the present disclosure. FIG. 5 is a top view illustrating an inner space of the door opening and closing device of the refrigerator according to an embodiment of the present disclosure. FIG. 6 is a bottom view illustrating an inner space of the door opening and closing device of the refrigerator according to an embodiment of the present disclosure. FIG. 7 is an exploded perspective view illustrating the door opening and closing device of the refrigerator according to an embodiment of the present disclosure.

In FIGS. 3 to 7, the refrigerator 1 may include a door opening and closing device 100.

The door opening and closing device 100 may open or close the door 30 of the refrigerator 1. The door opening and closing device 100 may be respectively mounted to each of the upper doors 30 and 40, without being limited thereto. If necessary, the door opening and closing device 100 may be mounted to only one door 30 of the pair of upper doors 30 and 40, or may also be mounted to the lower doors 50. For convenience of description, it is assumed that the door opening and closing device 100 is arranged in the first door 30.

The door opening and closing device 100 may include a device body 102, a drive device 110 included in the device body 102, and a pressure device 180 for separating the door 30 from the main body 10.

The device body 102 may include the drive device 110 and the pressure device 180 therein. The device body 102 may be arranged on the door 30. The device body 102 may be installed using a horizontal direction of the door 30 as a longitudinal direction. The device body 102 may include a lower device body 102b and an upper device body 102a. The upper device body 102 may be coupled to the lower device body 102b in a manner that a plurality of drive gears 122 and a rotary gear 124 are seated therein.

The drive device 110 may generate power, and may transmit the power to the door 30 so as to open or close the door 30.

The drive device 110 may include a power generation device and a power transmission device 120.

The power generation device may be provided to generate power for opening or closing the door 30. The power generation device may include a motor 112. The motor 112 may be disposed in the device body 102 so as to generate power, and may rotate in a forward or backward direction upon receiving a control signal from a controller 220 (see FIG. 17). Through forward or backward movement of the motor 112, the door 30 may move to a door open position or a door close position.

The power transmission device 120 may be disposed between the motor 112 and the hinge shaft 51, and may thus transmit power generated by the motor 112 to the hinge shaft 51. That is, power generated by the motor 112 may be transferred to the hinge shaft 51 through the power transmission device 120, such that the door 30 can operate.

The power transmission device 120 may include a plurality of drive gears 122 and a rotary gear 124. The plurality of drive gears 122 may rotate while simultaneously interacting with the motor 112. The rotary gear 124 may be mounted to the hinge shaft 51 while being meshed with the plurality of drive gears 122. The plurality of drive gears 122 and the rotary gear 124 may include gear teeth formed in at least a portion of circumferences thereof.

The power transmission device 120 may be shifted to any one of a power transmission state in which power of the motor 112 is transmitted to the hinge shaft 51 and a power non-transmission state in which power of the motor 112 is not transmitted to the hinge shaft 51, so that the door 30 can be automatically or manually opened or closed.

The power transmission device 120 may include at least one motor gear 132 configured to rotate by interacting with the motor 112, at least one door gear 134 configured to rotate by interacting with the opening and closing of the door 30, a center gear 136 meshed with the motor gear 132, and a pair of idle gears 138 meshed with the center gear 136. The door gear 134 mounted to the door may include an interrupter gear 140. A plurality of motor gears 132 and a plurality of the door gears 134 may be meshed with one another in series.

One side of each motor gear 132 may be meshed with a rotation shaft 112a of the motor 112, and the other side thereof may be meshed with the center gear 136. In the embodiment, the plurality of motor gears 132 may be used. One motor gear 132 located closest to the motor 112 may be meshed with the rotation shaft 112a of the motor 112, and the other motor gear 132 located closest to the hinge shaft 51 may be meshed with the center gear 136.

One side of the door gear 134 may be meshed with the center gear 136, and the other side thereof may be meshed with the rotary gear 124 coupled to the hinge shaft 51. However, the scope and spirit of the present disclosure are not limited thereto, and a plurality of door gears 134 may be used. One gear 134 located closest to the motor 112 may be meshed with the center gear 136, and the other gear 134 located closest to the hinge shaft 51 may be meshed with the rotary gear 124.

The pressure device 180 may be provided to press the main body 10 so as to open the door 30. When the door 30 located at the close position is opened, attractive force between a magnet contained in the gasket 36 provided in the door 30 and the main body 10 must be released. Therefore, after the door 30 and the main body 10 are separated from each other through the pressure device 180, the door 30 may be shifted to the open position through the power transmission device 120. Through the pressure device 180, force initially needed when the door 30 is shifted from the close position to the open position may be reduced, resulting in miniaturization of the motor 112.

The pressure device 180 may operate when the idle gears 138 are located at the power non-transmission position 139c. That is, after the door 30 and the main body 10 are separated from each other by the pressure device 180, the idle gears 138 move to a forward power transmission position 139a so as to transmit power in an opening direction of the door 30. The door opening and closing device 100 may include a delay member 194 by which the pressure device 180 can operate when the idle gears 138 are located at the power non-transmission position 139c.

The pressure device 180 may include a slide member 182 and a pressure member 184 (see FIGS. 2 to 6). The slide member 182 may be slidably movable by interacting with the power transmission device 120. The pressure member 184 (see FIGS. 2 to 6) may rotate by slidable movement of the slide member 182, and may thus pressurize the main body 10. The pressure member 184 may interact with slidable movement of the slide member 182, and may be rotatable with respect to the rotation shaft 184a. In other words, the slide member 182 may pressurize one side of the pressure member 184 through slidable movement, and the pressurized member 184 may rotate with respect to the rotation shaft 184a and may thus pressurize the main body 10 toward the other side of the pressure member 184. The door 30 may include a pressure hole 185a through which the pressure member 184 may protrude toward the main body 10.

The slide member 182 may be slidably movable in a longitudinal direction thereof. The pressure member 184 may be arranged at one end of the slide member 182, and may allow power generated from the power transmission device 120 to be transferred to the other end of the slide member 182.

The pressure member 180 may include an elastic member 186 (see FIGS. 2 to 6). The elastic member 186 may be configured in a manner that the slide member 182 pressurized by a pressure protrusion 174 and the pressure member 184 may first pressurize the main body 10 and may then elastically return to their original positions. Arrangement of the elastic member 186 is not limited thereto, and the elastic member 186 may also be implemented as any shape through which the slide member 182 and the pressure member 184 can return to their original positions. In the embodiment, the elastic member 186 may be arranged at the rotation shaft 184a of the pressure member 184, and may be configured in a manner that the pressure member 184 and the slide member 182 can elastically return to their original positions. The pressure device 180 may include a power conversion member 188. The power conversion member 199 may be arranged at the other end of the slide member 182, and may be configured in a manner that rotational force of the door gear 134 from among the drive gears 122 is converted into sliding-directional power of the slide member 182. The power conversion member 188 may be rotatably provided in the slide member 182.

The power conversion member 199 may include a pressurized surface 189 to be pressurized by at least one pressure protrusion 174 provided to the door gear 134. In more detail, at least one pressure protrusion 174 may be provided at a back surface of a mounting member 170, and may pressurize the pressurized surface 189 by rotation of the mounting member 170.

When the motor 112 rotates in a backward direction and moves the door 30 in the close direction, the power conversion member 188 may not transmit power of the motor 112 to the pressure device 180. When the motor rotates in a forward direction and moves the door 30 in the open direction, the power conversion member 188 may transmit power of the motor 112 to the pressure device 180.

The power conversion member 188 may be mounted to the other end of the slide member 182. When the motor 112 rotates in a forward direction, the power conversion member 188 may allow the pressurized surface 189 to be pressurized by the pressure protrusion 174. The power conversion member 188 may include a guide surface 190. When the motor 112 rotates in a backward direction, the guide surface 190 may allow the power conversion member 188 to rotate by movement of the pressure protrusion 174.

The pressure protrusion 174 may rotate by interacting with rotation of the center gear 136. The power conversion member 188 may convert rotational force of the pressure protrusion 174 into sliding-directional power of the slide member 182. Although the embodiment has exemplarily disclosed that one pair of the pressure protrusions 174 is mounted to the mounting member 170 for convenience of description, the scope or spirit of the embodiment is not limited thereto, it should be noted that one or more pressure protrusions 174 may be mounted to the mounting member 170.

The pressure device 180 may include a delay member 194.

The delay member 194 may restrict rotation of a switching member 162 in a manner that the power non-transmission position 139c where the idle gears 138 are not meshed with the door gear 134 is maintained.

The delay member 194 may be provided to the power conversion member 188. The switching member 162 may include a delay protrusion 168 contacting the delay member 194.

The delay protrusion 168 may be formed in a protrusion shape at a back surface of the switching member 162. Two delay protrusions 168 may be mounted to rotation shafts of the idle gears 138, respectively. During rotation of the switching member 162, the delay protrusions 168 may not contact one surface of the power conversion member 188. That is, the delay protrusion 168 may contact the delay member 194 disposed in the power conversion member 188 without contacting the power conversion member 188.

Figure 8:
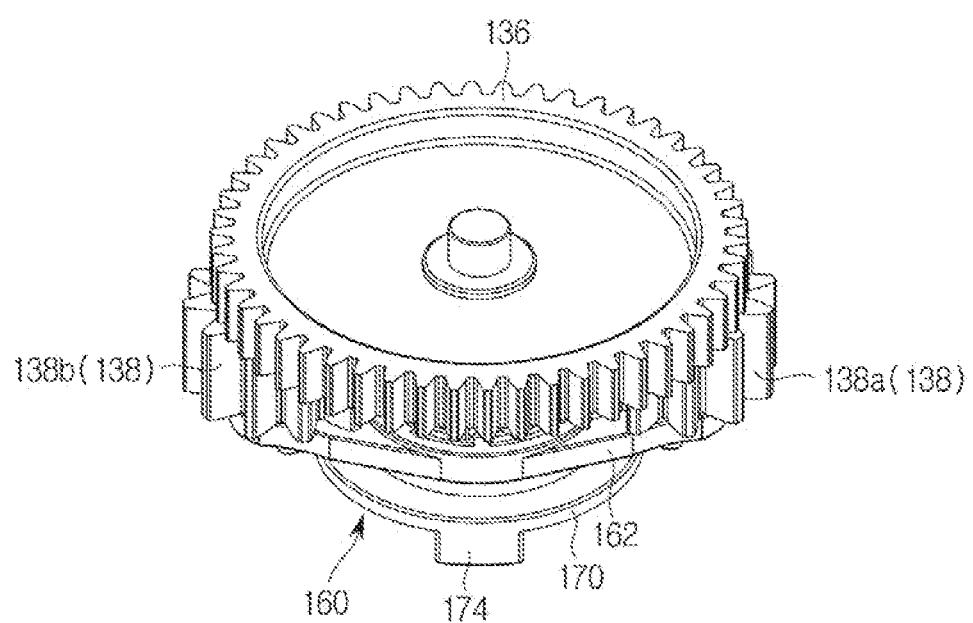
FIG. 8 is a top view illustrating a center gear and a switching unit of a refrigerator according to an embodiment of the present disclosure.
Figure 9:
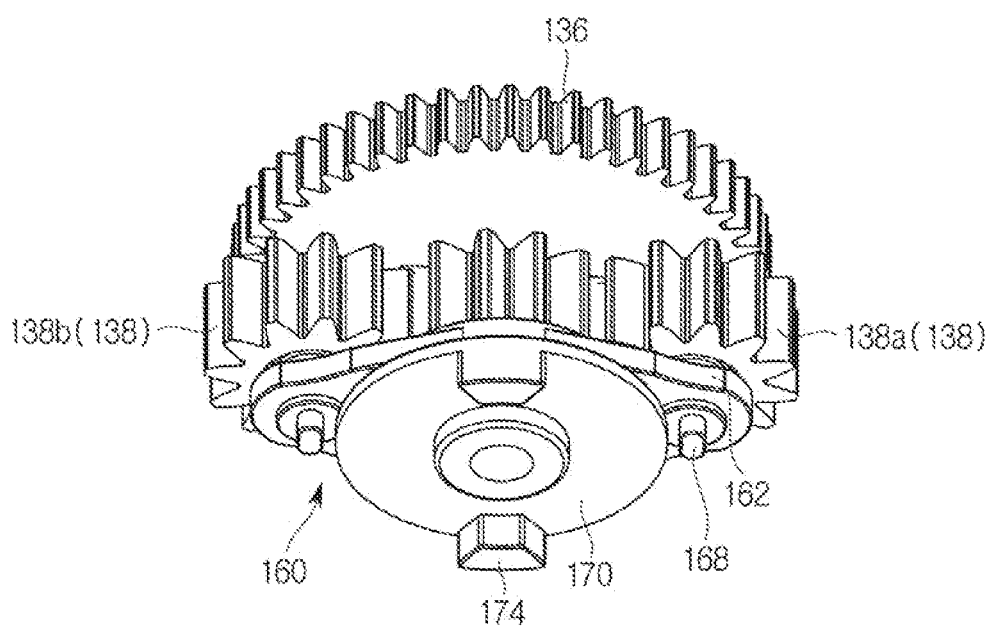
FIG. 9 is a perspective view illustrating a center gear and a switching unit of a refrigerator according to an embodiment of the present disclosure.
Figure 10:
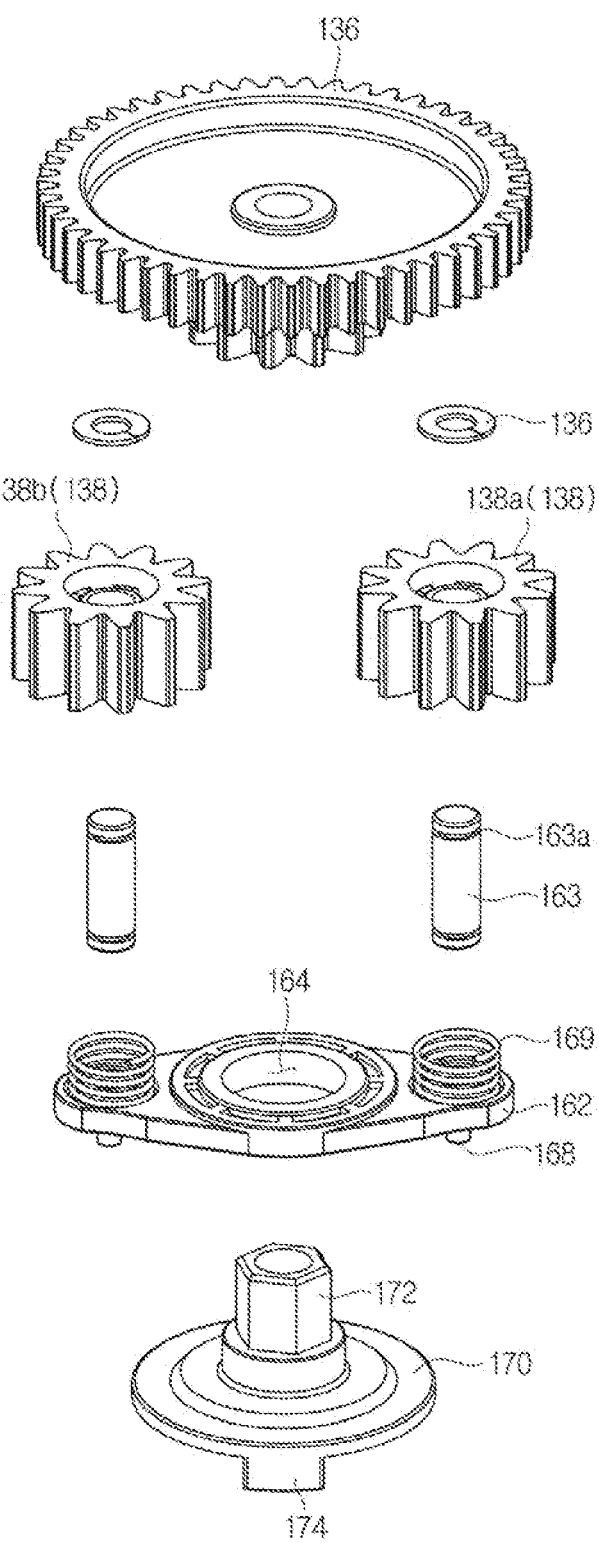
FIG. 10 is an exploded perspective view illustrating a center gear and a switching unit of a refrigerator according to an embodiment of the present disclosure.
Figure 11:
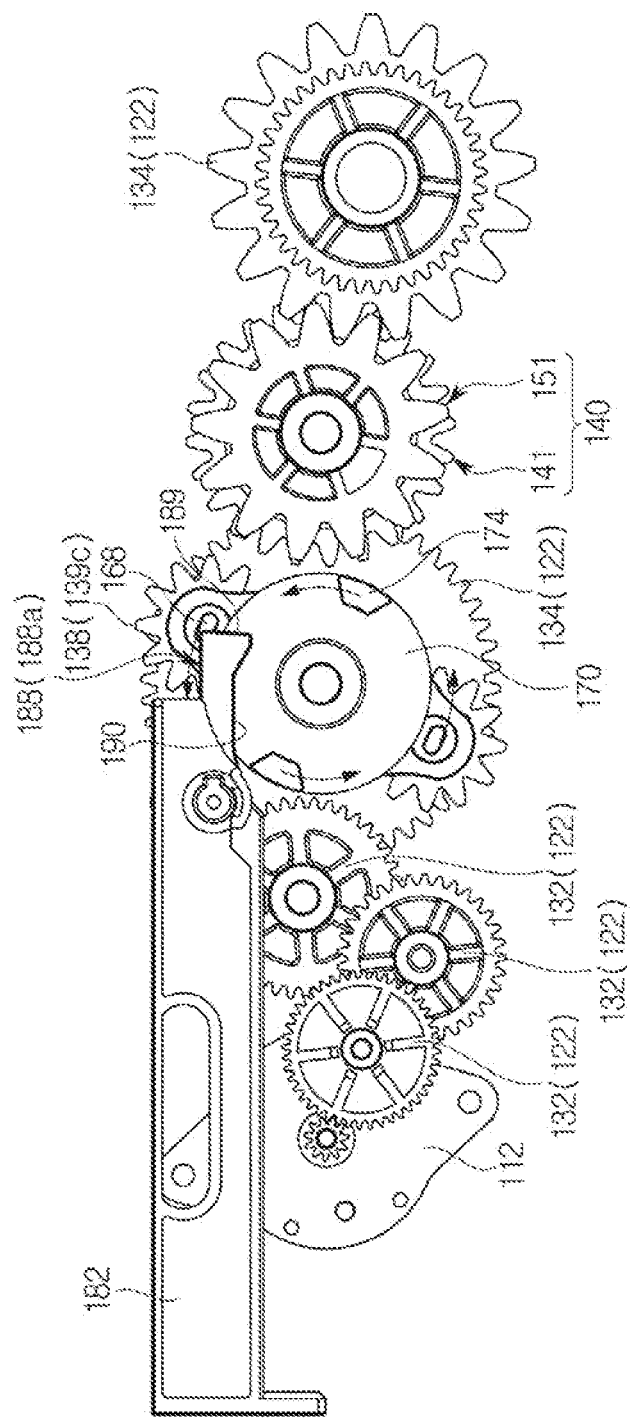
FIGS. 11, 12, 13, 14, 15 and 16 are views illustrating operations of a door opening and closing device of a refrigerator according to an embodiment of the present disclosure.
Figure 12:
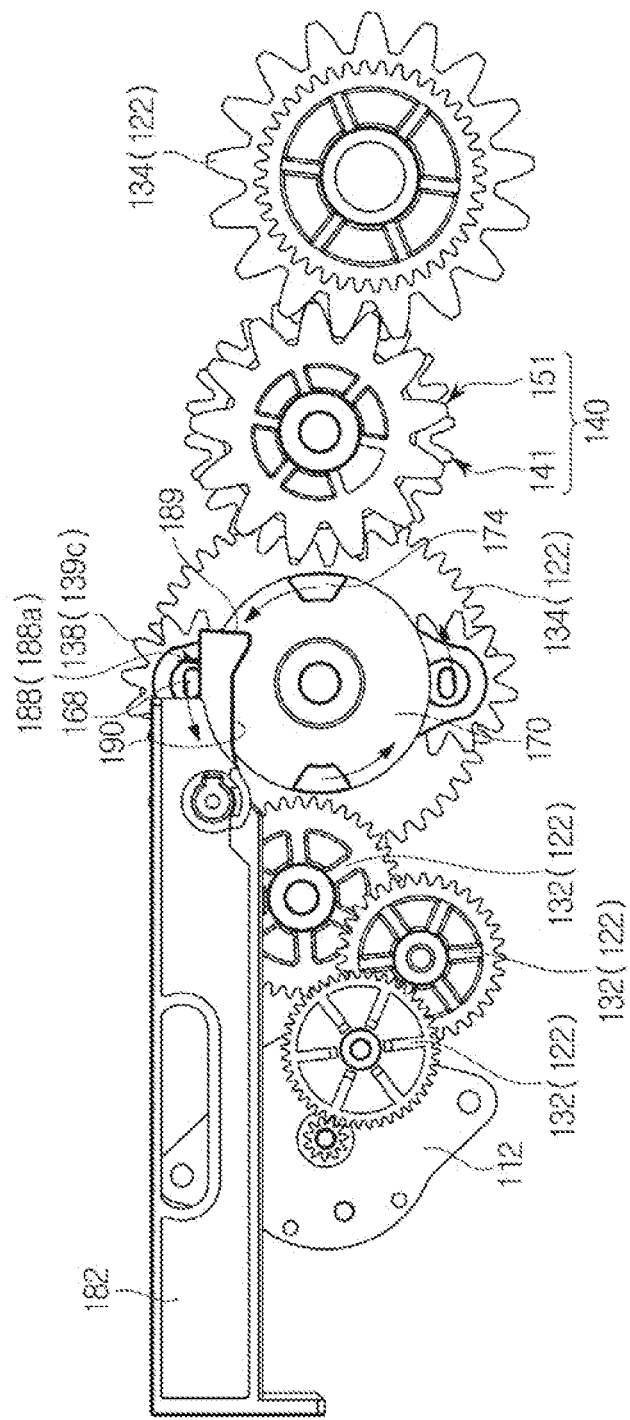
Figure 13:
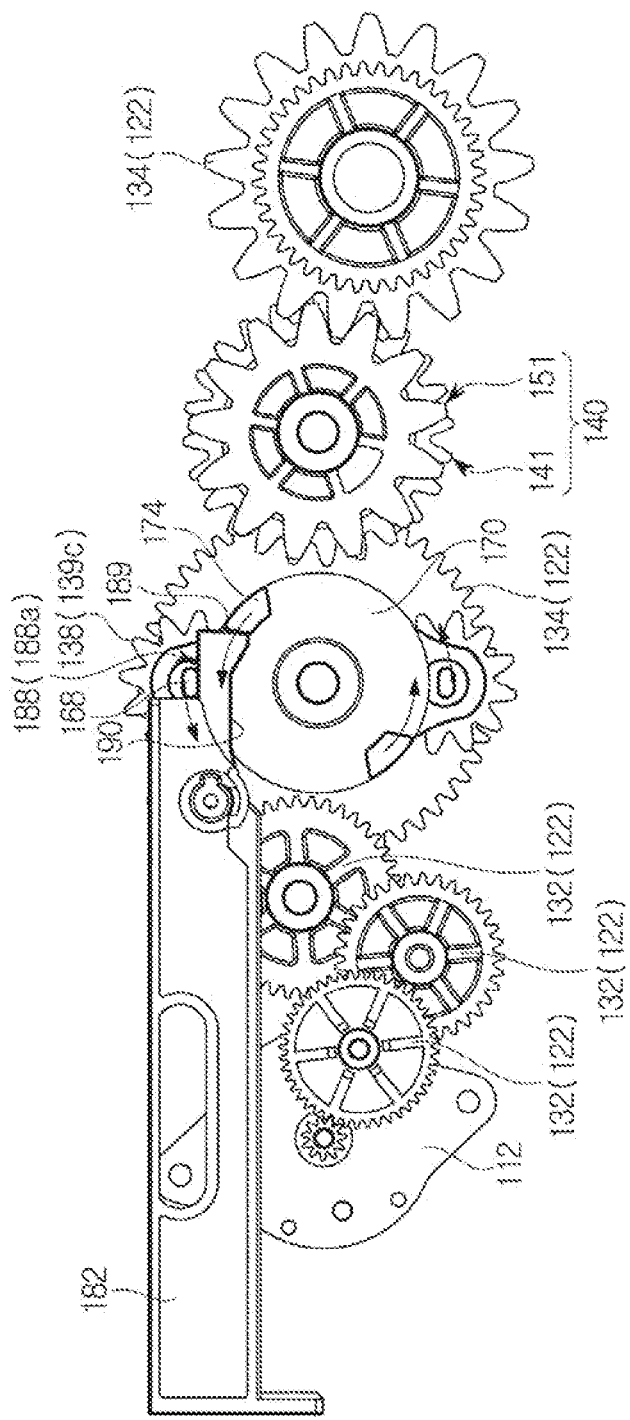

FIG. 8 is a top view illustrating a center gear and a switching unit of the refrigerator according to an embodiment of the present disclosure. FIG. 9 is a perspective view illustrating the center gear and the switching unit of the refrigerator according to an embodiment of the present disclosure. FIG. 10 is an exploded perspective view illustrating the center gear and the switching unit of the refrigerator according to an embodiment of the present disclosure.

Referring to FIGS. 8 to 10, the power transmission device 120 may include a switching unit 160. The switching unit 160 may be configured in a manner that one pair of idle gears 138 can turn around the rotation shaft of the center gear 136. The switching unit 160 may rotate around the rotation shaft of the center gear 136, and may include the switching member 162 to which the idle gears 138 are mounted and the mounting member 170 to which the center gear 136 is mounted.

The switching member 162 may include an idle-gear mounting shaft 163 to which one pair of the idle gears 138 is mounted, and a through hole 164. The switching member 162 may be formed in an approximately flat panel shape.

A mounting elastic member 169 may be mounted to an idle-gear mounting shaft 163, and may include an elastic member such as a spring. The mounting elastic member 169 may absorb shock (or impact) applied to the idle gears 138.

The mounting member 170 may include a center-gear mounting shaft 172 to which the center gear 136 is mounted, and may be configured in a manner that the switching member 162 is disposed between the mounting member 170 and the center gear 136. The mounting member 170 may rotate by interacting with the center gear 136, and may rotate independently from the switching member 162. That is, the mounting member 170 may rotate together with the center gear 136, and the switching member 162 may rotate independently from the mounting member 170 and the center gear 136.

The center-gear mounting shaft 172 passes through the through hole 164 so that the switching member 162 may be located at a top surface of the mounting member 170. The idle gear 138 is mounted to the idle-gear mounting shaft 163, so that the center gear 136 can be mounted to the center-gear mounting shaft 172.

The mounting elastic member 169 is mounted to the idle-gear mounting shaft 163, the idle gears 138 are mounted over the mounting elastic member 169, and a pressure member 165 pressurizing the idle gears 138 may pass on the idle gears 138, such that upward force of the idle gears 138 is generated from the mounting elastic member 169. The pressure member 165 may be coupled to a concave groove 163a formed along a circumferential direction at the outer circumference of the idle-gear mounting shaft 163.

By the above-mentioned structure, the idle gears 138 may interact with the motor 112, and may be shifted among a forward-rotation power transmission position 139a for transmitting forward rotation of the motor 112, a backward-rotation power transmission position 139b for transmitting backward rotation of the motor 112, and a power non-transmission position 139c for transmitting no power. The center gear 136 and the switching unit 160 may control one pair of the idle gears 138 to rotate so that any one of the idle gears 138 is meshed with the door gear 134, resulting in a power transmission state. In contrast, one pair of idle gears 138 meshed with the door gear 134 is then released from the door gear 134, resulting in a power non-transmission state.

That is, the power transmission state may indicate that the idle gears 138 are located at the forward-rotation power transmission position 139a or the backward-rotation power transmission position 139b, and the power non-transmission state may indicate that the idle gears 138 are located at the power non-transmission position 139c.

By the above-mentioned structure, operations of the door opening and closing device 100 for opening or closing the door 30 will hereinafter be described with reference to FIGS. 11 to 16.

For convenience of description and better understanding of the present disclosure, the rotation direction of the motor 112 when the door 30 moves to the open position will hereinafter be referred to as a forward rotation, and the rotation direction of the motor 112 when the door 30 moves to the close position will hereinafter be referred to as a backward rotation.

FIGS. 11 to 16 are views illustrating operations of the door opening and closing device of the refrigerator according to an embodiment of the present disclosure.

First, an exemplary case in which the door 30 located at the close position is shifted to the open position will hereinafter be described.

Figure 15:
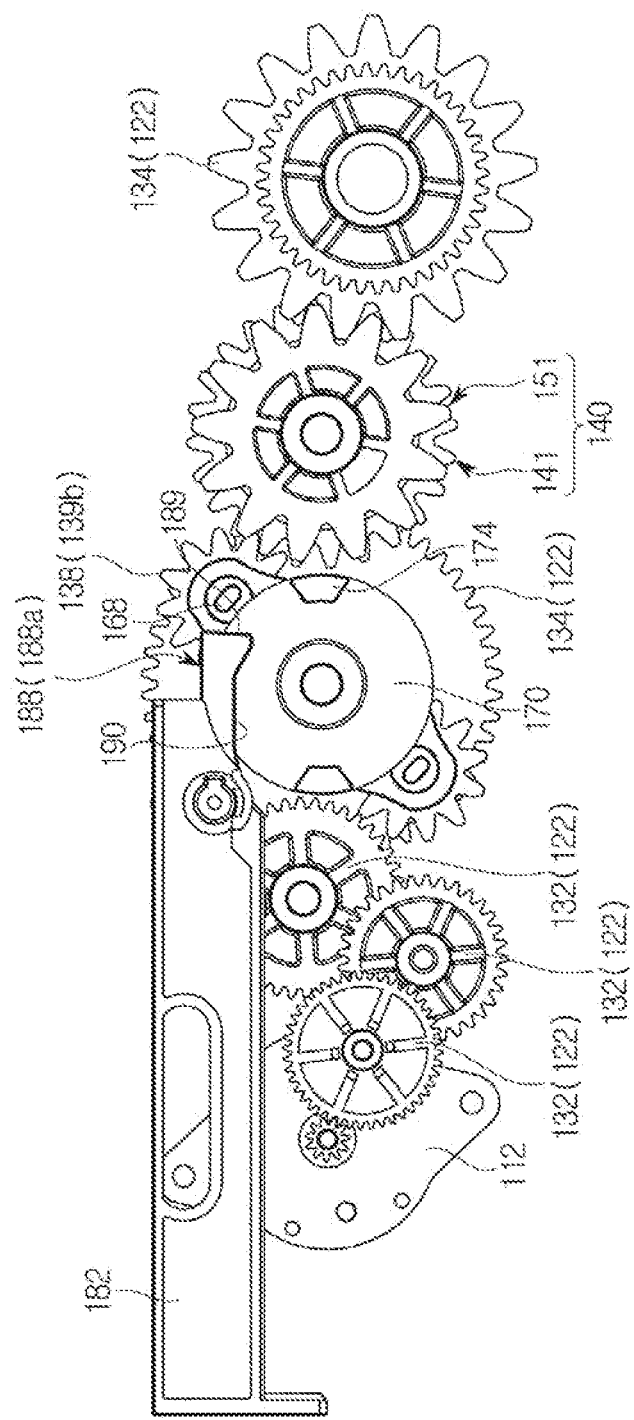
Figure 16:
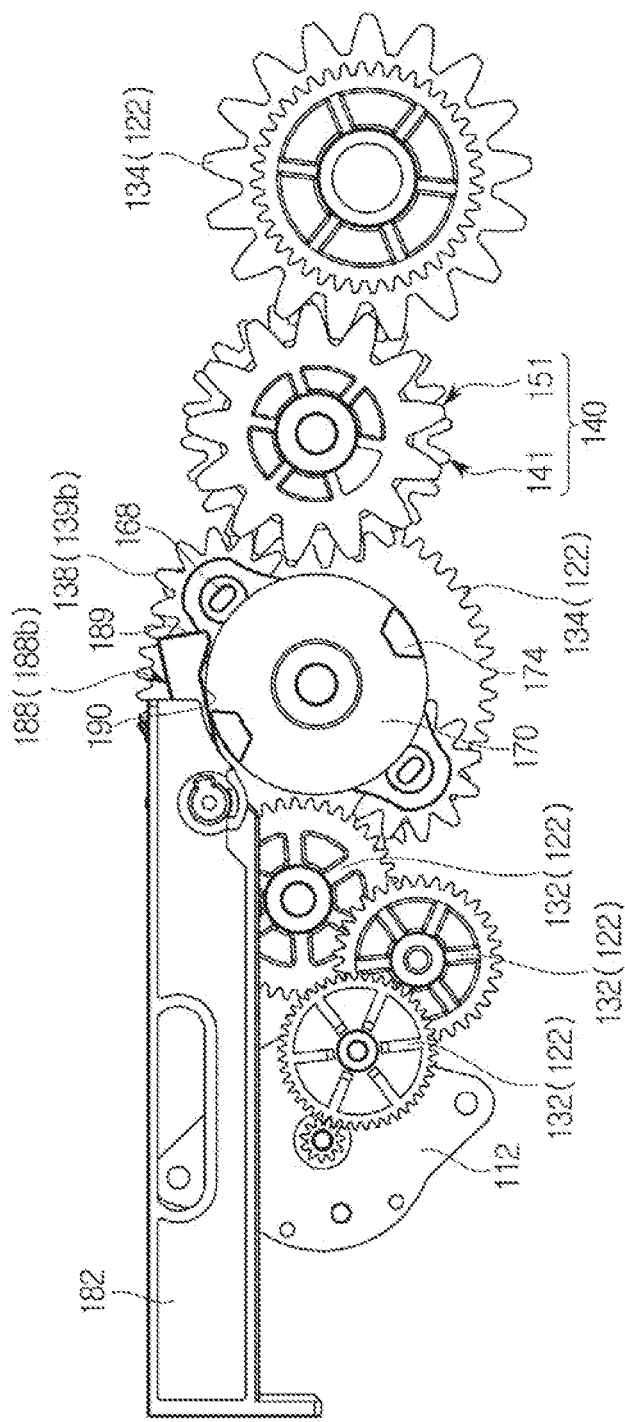

When the motor 112 rotates in a forward direction at the close position of the door 30, the switching unit 160 interacts with rotation of the center gear 136 according to rotation of the motor 112, such that one pair of idle gears 138 can move from the power non-transmission position 139c to the forward-rotation power transmission position, as shown in FIGS. 15 and 16. One pair of idle gears 138 may rotate with the switching member 162, such that the delay protrusion 168 provided at the switching member 162 may rotate toward the delay member 194.

Referring to FIG. 16, rotation of the switching member 162 and the idle gears 138 may be restricted because the delay protrusion 168 is in contact with the delay member 194, such that the power non-transmission position 139c of the idle gears 138 is maintained.

The reason why the idle gears 138 are kept at the power non-transmission position 139c is as follows. If the idle gears 138 continuously rotate without maintaining the power non-transmission position 139c, the idle gears 138 are meshed with the motor gear 112 on the condition that the door 30 is not opened. In this case, the idle gears 138 must overcome attractive force (i.e., attractive force between a magnet of the gasket and the main body) between the door 30 and the main body 10 only using power received from the motor 112, such that higher force than force needed to open the door 30 is needed for the idle gears 138. Therefore, excessive load is unavoidably applied to the idle gears 138. In order to prevent such excessive load, the power non-transmission position 139c is configured.

Figure 17:
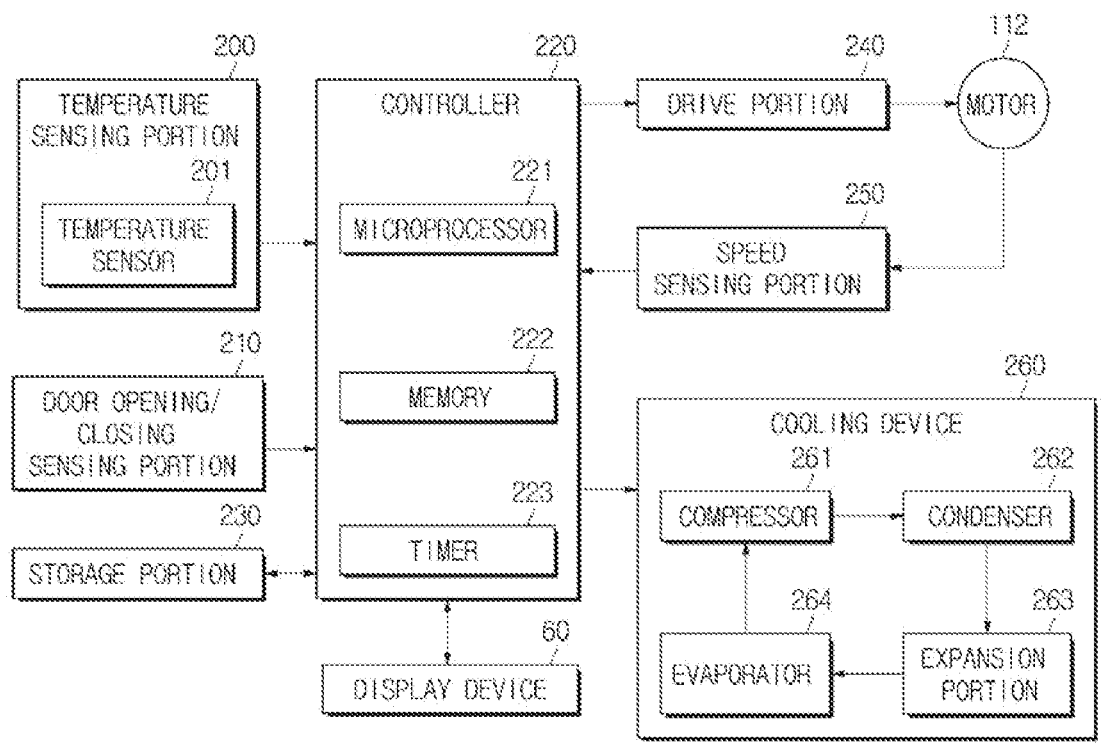
FIG. 17 is a block diagram illustrating a refrigerator according to an embodiment of the present disclosure.
Figure 18:
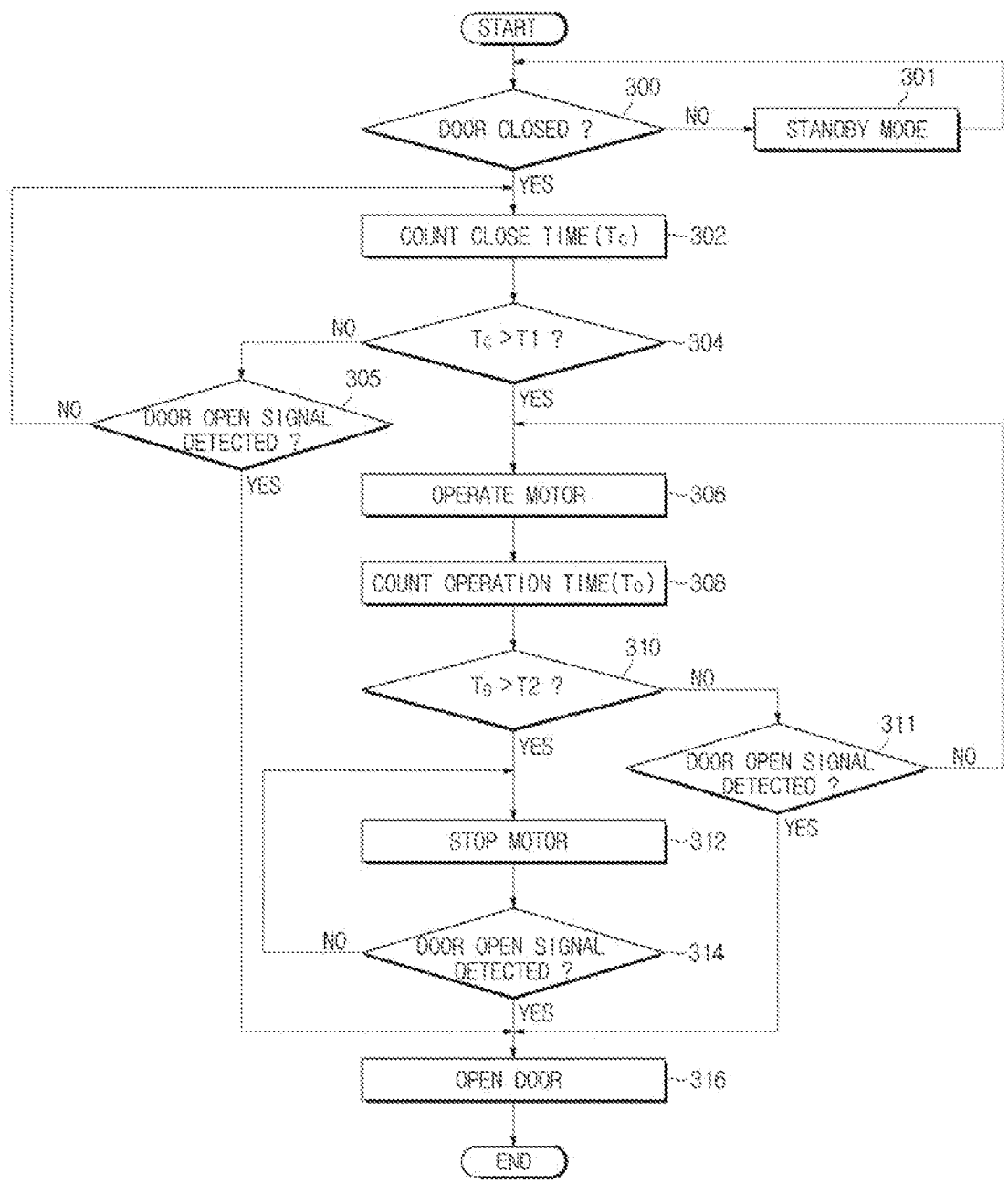
FIG. 18 is a flowchart illustrating a first algorithm of door opening control of a refrigerator according to an embodiment of the present disclosure.

Thereafter, as shown in FIGS. 17 and 18, when the motor 112 additionally rotates in a forward direction, the pressure protrusion 174 mounted to the mounting member 170 may pressurize the power conversion member 188 and the pressure device 180, by rotation of the center gear 136 and the mounting member 170 that rotate independently from the switching member 162.

By pressurizing the pressure device 180, the slide member 182 may slidably move, and the pressure member 184 may pressurize the main body 10 so that the door 30 is separated from the main body 10.

Figure 14:
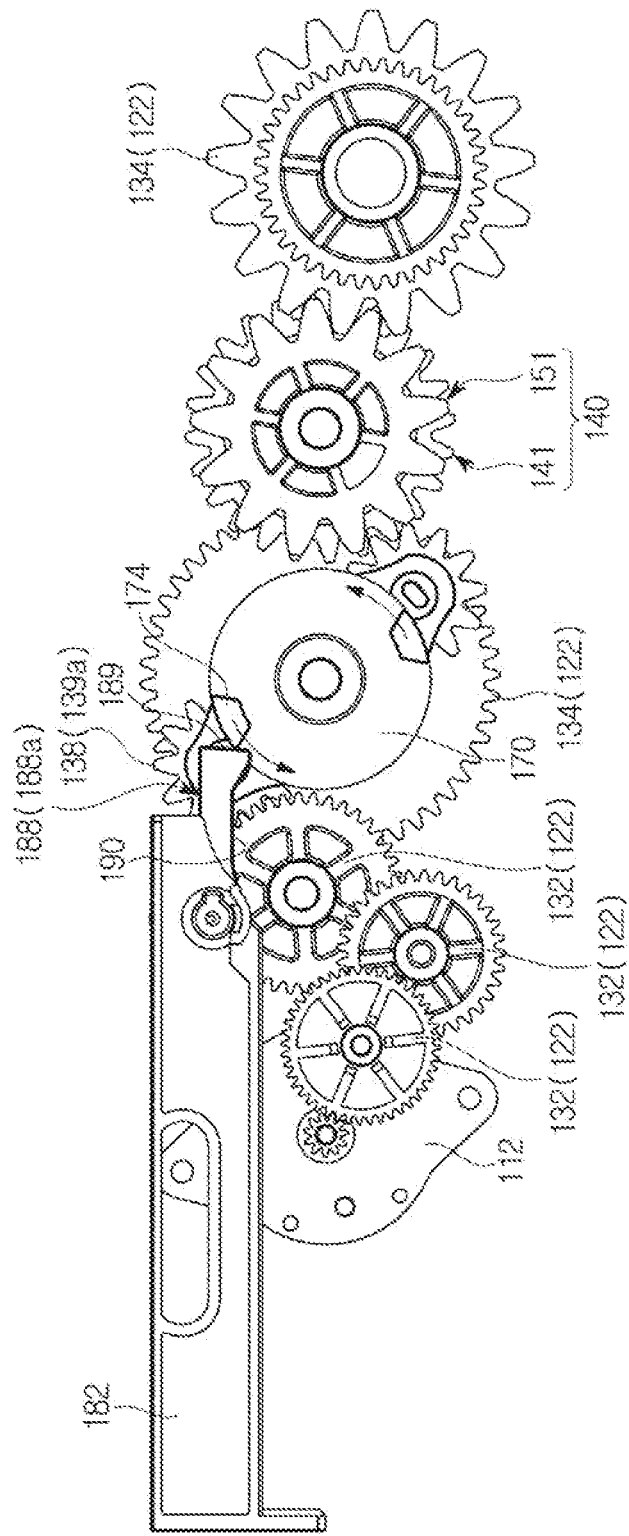

Thereafter, when the motor 112 additionally rotates in a forward direction, the idle gears 139 and the switching member 162 that are restricted in rotation by the delay member 194, may further rotate, so that the idle gears 138 are located at the forward-rotation power transmission position 139c (see FIG. 14). As a result, power generated from the motor 112 may be transmitted to the motor gear 132, the center gear 136, the idle gears 138, and the door gear 134, such that the door 30 moves to the open position.

The other case in which the door 30 moves from the open position to the close position will hereinafter be described.

When the motor 112 rotates in a backward direction at the open position of the door 30, the mounting member 170 may rotate by interacting with the center gear 136 according to rotation of the motor 112 as shown in FIGS. 15 and 16, such that the plurality of pressure protrusion 174 may rotate toward the power conversion member 188. The pressure protrusion 174 may pressurize a guide surface 190 while being in contact with the guide surface 190 of the power conversion member 188, such that the power conversion member 188 may rotate from the general position 188a to the rotation position 188b by pressure force of the pressure protrusion 174. As a result, differently from the case in which the door 30 moves from the close position to the open position, the power conversion member 188 may not be affected by the pressure protrusion 174.

Power generated in the backward rotational direction of the motor 112 may allow the idle gears 138 to move the backward-rotation power transmission position 139b. As a result, power generated by the motor 112 is transmitted to the motor gear 132, the center gear 136, the idle gears 138, and the door gear 134, such that the door 30 moves to the close position.

FIG. 17 is a block diagram illustrating the refrigerator according to an embodiment of the present disclosure.

Referring to FIG. 17, the refrigerator 1 according to an embodiment of the present disclosure may further include a temperature sensing portion 200, a door opening and closing sensing portion 210, a controller 220, a storage portion 230, a drive portion 240, a speed sensing portion 250, and a cooling device 260.

The temperature sensing portion 200 may detect an indoor air temperature of the storage chamber 20, and may output the detected temperature to the controller 220.

The temperature sensing portion 200 may include at least one temperature sensor 201 installed at arbitrary internal positions (e.g., the ceiling, bottom, or inner wall) of the storage chamber 20 so as to detect indoor air temperature of the storage chamber 20.

The temperature sensor 201 may be implemented as a contact temperature sensor or a non-contact temperature sensor. In more detail, the temperature sensor 201 may be implemented as any one of a resistance temperature detector (RTD) temperature sensor configured to use the change of metal resistance depending upon temperature variation, a thermistor temperature sensor configured to use the change of semiconductor resistance depending upon temperature variation, a thermocouple temperature sensor configured to use EMF (electromotive force) generated at both ends of a junction point of two metal lines, and an IC temperature sensor configured to use any one of a voltage generated from both ends of a transistor having characteristics changed according to temperature, and current-voltage characteristics of a PN junction unit of the transistor. However, the scope or spirit of the temperature sensor 201 according to the embodiment is not limited thereto, and various temperature detection machines may also be used by those skilled in the art without departing from the scope or spirit of the present disclosure.

The door opening and closing sensing portion 210 may detect the opening or closing of the door 30, and may transmit the detected result to the controller 220.

The door opening and closing sensing portion 210 may be provided in the gasket 36 for sealing the space between the main body 10 and the closed door 30.

The door opening and closing sensing portion 210 is provided to the door knob 30a, such that the opening signal of the door 30 may be input to the door opening and closing sensing portion 210 when the user grasps the door knob 30a to open the door 30.

The door opening and closing sensing portion 210 may detect whether the door 30 is opened or closed in various ways.

For example, the door opening and closing sensing portion 210 may include a micro-switch module installed in response to the storage chamber 20.

The micro-switch module may include a rotary member (rm) and a micro-switch (ms).

The rotary member (rm) may transmit pressure generated when the door 30 is in close contact with the storage chamber 20 to the micro-switch (ms), and the micro-switch (ms) may convert pressure received from the rotary member (rm) into an electric signal.

Likewise, when the micro-switch module is in close contact with the storage chamber 20, the micro-switch module may transmit the door close signal to the controller 220.

Although the above-mentioned embodiment has exemplarily disclosed the door opening and closing sensing portion 210 including a micro-switch module, the micro-switch module is only an example of the door opening and closing sensing portion 210, without being limited thereto.

For example, the door opening and closing sensing portion 210 may include an infrared sensor module, and a laser sensor module. The infrared sensor module may emit infrared light to the storage chamber 20, and may detect the infrared light reflected from the storage chamber 20. The laser sensor module may emit laser light to the storage chamber 20, and may detect the laser light reflected from the storage chamber 20.

The controller 220 may control overall operation of the refrigerator 1, and may include a microprocessor 221, a memory 222, and a timer 223.

The microprocessor 221 may retrieve data stored in the memory 222 according to a program stored in the memory 222, and may perform arithmetic or logical operation on the retrieved data. In addition, the microprocessor 221 may output the arithmetic or logical operation result to the memory 222.

The memory 222 may include a volatile memory from which the stored data is deleted when powered off. The volatile memory may retrieve the program and data from the storage portion 230 to be described later, and may temporarily store the retrieved data therein. The volatile memory may provide the microprocessor 221 with the stored program and data, and may store data generated from the microprocessor 221. The volatile memory may include SRAM, DRAM, etc.

Although the microprocessor 221 and the memory 222 have been functionally distinguished from each other for convenience of description, it should be noted that the microprocessor 221 and the memory 222 are not always physically distinguished from each other. For example, the microprocessor 221 and the memory 222 may be implemented in different chips, or may also be implemented as a single chip as necessary.

The timer 223 may count the open time of the door 30 and the close time ($T_c$) of the door 30.

The timer 223 may count the operation time ($T_o$) of the motor 112 configured to open or close the door 30.

The controller 220 may control the cooling device 60 on the basis of the sensing result of the temperature sensing portion 200 in a manner that an indoor air temperature of the storage chamber 20 is kept at a temperature of a predetermined range in which food is stored in a fresh state.

The controller 220 may open or close the door 30 by applying a duty signal to the motor 112. The duty signal applied to the motor 112 may be switched by PWM control of the controller 220, such that the duty ratio of the PWM signal can be adjusted.

After lapse of a predetermined time (about 2~3 seconds) after the door 30 is fully closed, the controller 220 may operate the motor 112 with output power (about 30% of the motor output power requisite for door opening) where the door 30 is not opened.

As a result, when the door 30 is opened, the pressure device 180 for separating the door 30 from the main body 10 and the power transmission device 120 for slidably moving the slide member 182 of the pressure device 180 are optimized in position, such that idling of the motor 112 is prevented, resulting in noise generated by opening of the door 30.

The power transmission device 120 for slidably moving the slide member 182 of the pressure device 180 is fixed to a normal position, such that the opening time of the door 30 can be maintained at a predetermined time.

Therefore, the normal position of the power transmission device 120 may be established without using a sensor capable of detecting the position of the power transmission device 120 that operates the pressure device 180 by applying power to the pressure device 180.

As described above, the controller 220 may control overall operation of the refrigerator 1, and may control various kinds of loads contained in the refrigerator 1.

It may be interpreted that the refrigerator 1 to be described later will operate upon receiving a control signal from the controller 220.

The storage portion 230 may store not only control program and control data needed to control the refrigerator 1, but also various application programs and application data needed to perform various functions based on user input signals.

The storage portion 230 may store a temperature control value according to the storage chamber 20's operation condition decided by the controller 220. For example, the storage portion 230 may store not only a sensing period of the temperature sensing portion 200, but also data about an operation time or operation RPM of a compressor 261 based on the detection result of the temperature sensing portion 200, and may store a control program for controlling the refrigerator 1, and programs such as a dedicated application initially supplied from a manufacturing company or a universal application downloaded from the external part.

The drive portion 240 may drive the motor 112 associated with the opening and closing operation of the door 30, the compressor 261 associated with the cooling of the refrigerator 1, an expansion portion 263, etc. according to a drive control signal of the controller 220.

The speed sensing portion 250 may detect the speed of the motor 110 operated to open/close the door 30, and may output the detection result to the controller 220.

The speed sensing portion 250 may detect an output signal of a hall sensor embedded in the motor 110, and may thus detect the speed of the motor 110.

The cooling device 260 may allow the temperature of the storage chamber 20 to remain within a predetermined range using refrigerant evaporation.

In more detail, the cooling device 260 may include a compressor 261 to compress gas refrigerant, The cooling portion 260 may include a compressor 261 to compress gaseous refrigerant, a condenser 262 to convert the compressed gaseous refrigerant into liquid refrigerant, an expansion portion 263 to decompress the liquid refrigerant, and an evaporator 264 to convert the decompressed liquid refrigerant into liquid refrigerant.

The compressor 261 may compress suctioned low-temperature and low-pressure gaseous refrigerant, and may thus discharge high-temperature and high-pressure gaseous refrigerant.

For this purpose, the compressor 261 may mandatorily suction the refrigerant, and may compress the suctioned refrigerant to produce high-temperature and high-pressure gas. Suctioning of the refrigerant may be carried out using rotational force of an embedded motor. By the refrigerant suctioning force of the compressor 261, the refrigerant may circulate in the cooling cycle of the refrigerator 1. Therefore, the refrigerant circulation amount and the refrigerant circulation speed may be determined according to the driving degree of the compressor 261, and the cooling efficiency of the refrigerator 1 may also be determined.

In addition, the compressor 261 may include an inlet through which refrigerant is introduced, a flow space in which introduced refrigerant flows, a motor rotating in the flow space and constituent elements associated with the motor, and an outlet through which compressed refrigerant is discharged.

The high-temperature and high-pressure gaseous refrigerant compressed by the compressor 261 may be transferred to the condenser 262.

The condenser 262 may be connected to a discharge tube of a high-pressure part of the compressor 261 in a manner that high-temperature and high-pressure gaseous refrigerant compressed by the compressor 261 exchanges heat with ambient air, such that the high-temperature and high-pressure gaseous refrigerant is condensed into liquid refrigerant. In the condenser 262, the refrigerant is liquefied to emit heat to the outside, such that a temperature of the refrigerant is reduced.

The expansion portion 263 may expand normal-temperature and high-pressure liquid refrigerant condensed by the condenser 262 into 2-phase refrigerant in which low-temperature and low-pressure liquid and gas components are mixed. The expansion portion 263 may be implemented as an expansion valve.

The expansion portion 263 may also be implemented as a capillary tube, instead of the expansion valve. The capillary tube may also be implemented as a slender tube, and the refrigerant passing through the capillary tube is stepped down and then applied to the evaporator 264.

The evaporator 264 may provide cold air by evaporating low-temperature and low-pressure liquid refrigerant expanded by the expansion portion 263 into a gaseous state.

As described above, the cooling device 260 may absorb heat energy from ambient air when stepped-down liquid refrigerant is converted into a gaseous refrigerant, and may thus provide the storage chamber 20 with cold air.

Meanwhile, the structure of the cooling device 260 is not limited to the condenser 262, the expansion portion 263, and the evaporator 264, without being limited thereto.

Operations and effects of a refrigerator and a method for controlling the same according to the embodiment of the present disclosure will hereinafter be described in detail.

For convenience of description and better understanding of the present disclosure, the rotation direction of the motor 112 when the door 30 moves to the open position will hereinafter be referred to as a forward rotation, and the rotation direction of the motor 112 when the door 30 moves to the close position will hereinafter be referred to as a backward rotation.

FIG. 18 is a flowchart illustrating a first algorithm of door opening control of the refrigerator according to an embodiment of the present disclosure.

Referring to FIG. 18, the controller 220 may determine whether the door 30 is closed (300). Information as to whether the door 30 is closed may be detected by the door opening and closing sensing portion 210 mounted to the door 30. The door opening and closing sensing portion 210 may be mounted to one side of a back surface of the door 30, or may be mounted to the gasket 36 or the door knob 30a, such that the door opening and closing sensing portion 210 may determine whether the door 30 is closed or not.

For example, when the door opening and closing sensing portion 210 is implemented as a micro-switch module, the micro-switch (ms) may detect pressure generated when the door 30 is in close contact with the storage chamber 20, and may output the detected pressure signal to the controller 220. Therefore, the controller 220 may detect whether the door 30 is closed using the output signal of the micro-switch (ms).

Besides, when the door opening and closing sensing portion 210 is implemented as the infrared sensor module, the infrared sensor module may detect the light reflected from the storage chamber 20 when the door 30 is in close contact with the storage chamber 20, and may output the detected light signal to the controller 220. Therefore, the controller 220 may detect whether the door 30 is closed using the output signal of the infrared sensor module. When the door 30 is closed (300), the controller 220 may count the close time ($T_c$) of the door 30 using the embedded timer 223 (302).

Subsequently, the controller 220 may determine whether the counted door close time ($T_c$) is longer than a first time T1 (i.e., a reference time (about 2~3 seconds) for determining whether the door is fully closed) (304). The reason why the controller 220 determines whether the counted door close time ($T_c$) is longer than the first time T1 is to determine whether a predetermined time (about 2~3 seconds) has elapsed after the door 30 has been closed such that the controller 220 can determine whether the user immediately opens the door 30 as soon as the user closes the door 30.

When the door close time ($T_c$) is longer than the first time T1 (304), the controller 220 may determine that a predetermined time has elapsed after the door 30 has been fully closed.

Therefore, after lapse of the predetermined time after the door 30 has been closed, the controller 220 may control the motor 112 to rotate in a forward direction with power where the door 30 is not opened (306).

The controller 220 may store a value corresponding to the motor 112' output power where the door 30 is not opened. That is, the controller 220 may store the duty signal by which the door 30 is kept at the door close position although the motor 112 operates. The duty signal by which the door 30 does not move may indicate that, assuming that the motor 112's output power needed to open the door 30 is set to 100%, the motor 112 operates by output power of about 30% or less.

Therefore, after lapse of a predetermined time after the door 30 has been closed, when the controller 220 outputs the duty signal, the drive portion 240 may operate the motor 112 upon receiving the duty signal from the controller 220. In this case, the duty signal for operating the motor 112 may operate the motor 112 with about 30% or less of the motor 112' output power needed to open the door 30, such that the door 30 is not opened.

As described above, after the motor 112 starts operation with the output power where the door 30 is not opened, when the door 30 is opened, the pressure device 180 and the power transmission device 120 are optimized in position such that idling of the motor 112 is prevented, resulting in reduction of noise generated when the door 30 is opened. In addition, the power transmission device 120 is fixed to a normal position, such that the opening time of the door 30 is maintained at a constant time.

Subsequently, the controller 220 may count the operation time ($T_o$) of the motor 112 using the embedded timer 223 (308).

The controller 220 may determine whether the counted motor operation time ($T_o$) is longer than a second time T2 (i.e., a reference time (about 30 seconds) needed to operate the motor in a manner that the door is not opened) (310).

When the motor operation time ($T_o$) is longer than the second time T2 (310), the controller 220 may determine that the motor 112 has already operated in a manner that the door 30 is not opened.

Therefore, the controller 220 may control the motor 112 to stop operation through the drive portion 240, such that the motor 112 is maintained at a standby mode (312).

The controller 220 may determine whether the door open signal has been detected through the door opening and closing sensing portion 210 (314). The opening or closing state of the door 30 may be detected by the door opening and closing sensing portion 210 mounted to the door 30.

For example, when the door opening and closing sensing portion 210 is implemented as the micro-switch module, the micro-switch (ms) may detect pressure generated when the door 30 is separated from the storage chamber 20, and may output the detected pressure signal to the controller 220. Therefore, the controller 220 may determine whether the door 30 is opened using the signal received from the micro-switch (ms).

Besides, when the door opening and closing sensing portion 210 is implemented as the infrared sensor module, the controller 220 may detect light reflected from the storage chamber 20, and may output the detected reflected light to the controller 220. Therefore, the controller 220 may detect whether the door 30 is opened using the signal received from the infrared sensor module. When the door open signal is not detected (314), the controller 220 may feed back to operation 314, and may perform subsequent operations starting from operation 314.

When the door open signal is detected (314), the controller 220 may immediately open the door 30 by controlling the motor 112 through the drive portion 240 (316).

When the door 30 is not closed (300), the controller 220 may determine that the door 30 is opened, and may thus maintain the standby mode (301).

When the door close time ($T_c$) is not longer than the first time T1 (304), the controller 220 may determine that a predetermined time has not elapsed after the door 30 has been closed.

Therefore, the controller 220 may count the door close time ($T_c$), and may thus determine whether the door opening signal has been detected through the door opening and closing sensing portion 210 (305).

When the door opening signal is not detected (305), the controller 220 may feed back to operation 302, and may perform subsequent operations starting from operation 302.

When the door open signal is detected (305), the controller 220 may proceed to operation 316, such that the controller 220 may immediately open the door 30 by controlling the motor 112 through the drive portion 240.

When the motor operation time ($T_o$) is not longer than the second time T2 (310), the controller 220 may determine that the motor 112 has not operated in advance in a manner that the door 30 is not opened.

Therefore, the controller 220 may continuously count the motor operation time ($T_o$), and at the same time may determine whether the door open signal has been detected through the door opening and closing sensing portion 210 (311).

When the door open signal is not detected (311), the controller 220 may feed back to operation 308, and may perform subsequent operations starting from operation 308.

When the door open signal is detected (311), the controller 220 may proceed to operation 316, and may control the motor 112 through the drive portion 240 so that the door 30 is immediately opened.

The embodiment of FIG. 18 has exemplarily disclosed that, after lapse of a predetermined time after the door 30 has been fully closed, the motor 112 is operated in advance in a manner that the door 30 is not opened, the scope and spirit of the present disclosure are not limited thereto, and the motor 112 can operate in advance in a manner that the door 30 is not immediately opened after the door 30 is fully closed. The above-mentioned concept will hereinafter be described with reference to FIG. 19.

Figure 19:
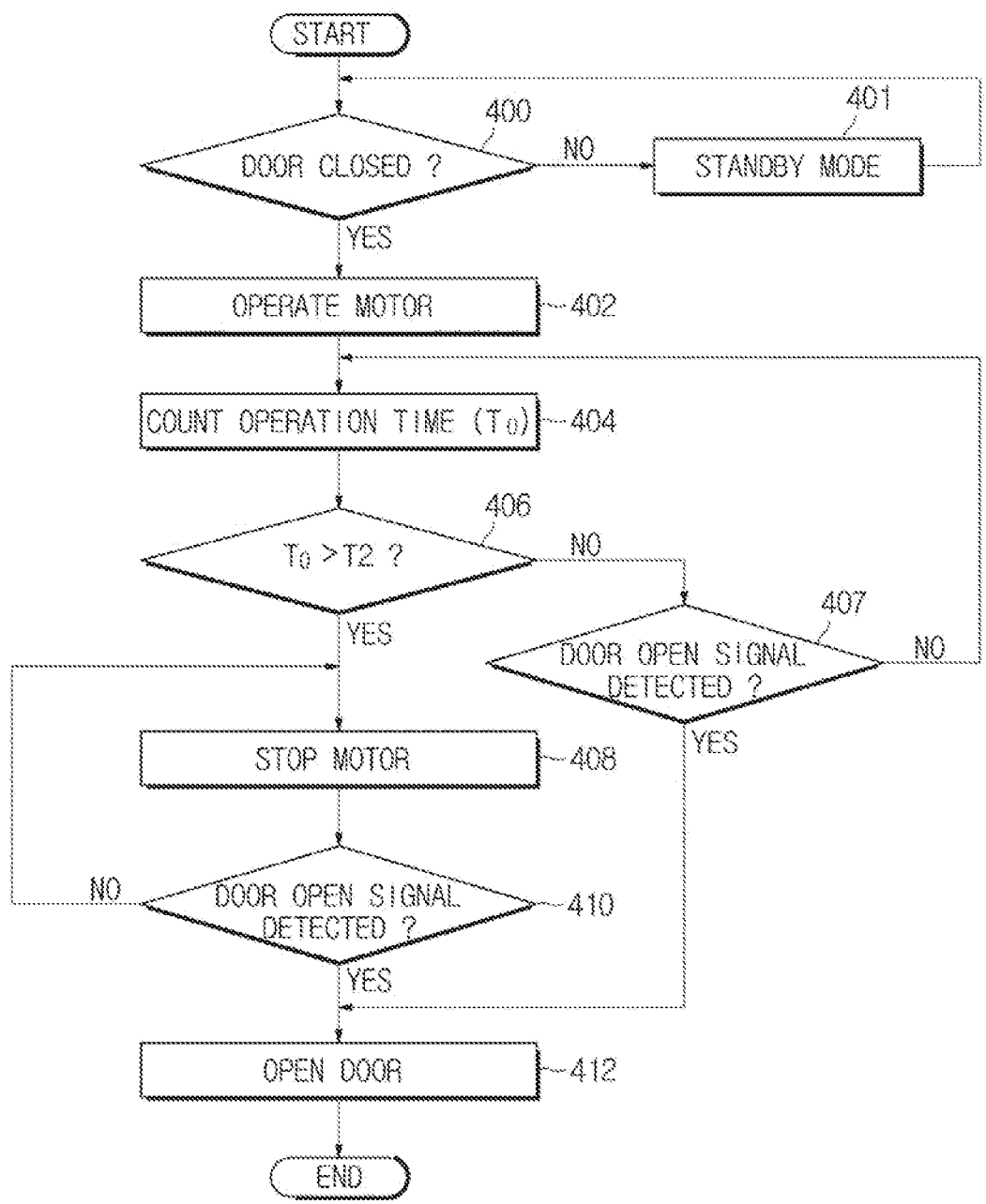
FIG. 19 is a flowchart illustrating a second algorithm of door opening control of a refrigerator according to an embodiment of the present disclosure.

FIG. 19 is a flowchart illustrating a second algorithm of door opening control of the refrigerator according to an embodiment of the present disclosure.

Referring to FIG. 19, the controller 220 may determine whether the door 30 has been closed (400). Information as to whether the door 30 is closed may be detected by the door opening and closing sensing portion 210 mounted to the door 30.

When the door 30 is closed (400), the controller 220 may operate the motor 112 with the output power where the door 30 is not opened (402).

The reason why the motor 112 operates with the output power where the door 30 is not opened is that the motor 112 operates with about 30% or less of the motor output power needed to open the door 30.

As described above, if the motor 112 operates with the output power where the door 30 is not opened, when the door 30 is opened, the pressure device 180 and the power transmission device 120 are optimized in position, such that idling of the motor 112 is prevented, resulting in noise generated by opening of the door 30. In addition, the power transmission device 120 is fixed to a normal position, such that the opening time of the door 30 can be maintained at a predetermined time.

Subsequently, the controller 220 may count the operation time ($T_o$) of the motor 112 using the embedded timer 223 (404).

The controller 220 may determine whether the counted motor operation time ($T_o$) is longer than the second time T2 (i.e., a reference time (about 30 seconds) needed to operate the motor in a manner that the door is not opened) (406).

When the motor operation time ($T_o$) is longer than the second time T2 (406), the controller 220 may determine that the motor 112 has already operated in a manner that the door 30 is not opened.

Therefore, the controller 220 may control the motor 112 to stop operation through the drive portion 240, such that the motor 112 is maintained at a standby mode (408).

The controller 220 may determine whether the door open signal has been detected through the door opening and closing sensing portion 210 (410).

When the door open signal is not detected (410), the controller 220 may feed back to operation 408, and may perform subsequent operations starting from operation 408.

When the door open signal is detected (410), the controller 220 may control the motor 112 through the drive portion 240, and may immediately open the door 30 (412).

When the door 30 is not closed (400), the controller 220 may determine that the door 30 has been opened, and may maintain the standby mode (401).

When the motor operation time ($T_o$) is not longer than the second time T2 (406), the controller 220 may determine that the motor 112 has not operated in advance in a manner that the door 30 is not opened.

Therefore, the controller 220 may continuously count the motor operation time ($T_o$), and at the same time may determine whether the door open signal has been detected through the door opening and closing sensing portion 210 (407).

When the door open signal is not detected (407), the controller 220 may feed back to operation 404, and may perform subsequent operations starting from operation 404.

When the door open signal is detected (407), the controller 220 may proceed to operation 412, and may control the motor 112 through the drive portion 240 so that the door 30 is immediately opened.

Meanwhile, although the embodiment of the present disclosure has exemplarily disclosed that, after lapse of a predetermined time while the motor 112 operates with the output power where the door 30 is not opened, the motor 112 stops operation, the scope and spirit of the present disclosure are not limited thereto. For example, the embodiment may detect the speed of the motor 112 while the motor 112 operates with the output power where the door 30 is not opened, such that the motor 112 may stop operation at a specific time where the speed of the motor 112 becomes zero.

As is apparent from the above description, the refrigerator and the method for controlling the same according to the embodiments of the present disclosure can automatically open or close door(s) of the refrigerator by controlling a motor. After lapse of a predetermined time after the door of the refrigerator has been closed, the refrigerator operates a motor with an output power where the door is not opened, such that the refrigerator can remove noise while simultaneously maintaining a constant door opening time when the door is opened. In addition, when the door opening signal time is detected, the refrigerator can immediately open the door.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A refrigerator comprising:
a main body;
a door rotatably coupled to the main body with respect to a hinge shaft;
a door operation device configured to open the door;
a door sensor configured to detect whether the door is opened or closed; and
a controller configured to control the door operation device,
wherein the door operation device includes:
a pressure device configured to press the main body so as to open the door; and
a drive device including a power generation device configured to generate power, and a power transmission device configured to transmit the power to the pressure device and the hinge shaft,
wherein the controller is configured to:
operate the power generation device with a first output value to open the door based on a door opening signal transmitted from the door sensor, and
operate the power generation device with a second output value smaller than the first output value, when a first time elapses after the door is closed.

2. The refrigerator according to claim 1, wherein the controller is further configured to stop operation of the power generation device when an operation time of the power generation device operating with the second output value passes a second time.

3. The refrigerator according to claim 2, wherein the second time is longer than the first time.

4. The refrigerator according to claim 1, wherein the controller is further configured to detect a speed of the power generation device operating with the second output value, and stop operation of the power generation device when the speed of the power generation device becomes zero.

5. The refrigerator according to claim 1, wherein the power transmission device is disposed between the power generation device and the hinge shaft of the door.

6. The refrigerator according to claim 1, wherein the power transmission device comprises:
a drive gear configured to rotate by interacting with the power generation device; and
a rotary gear configured to be meshed with the drive gear and coupled to the hinge shaft of the door,
wherein the controller is configured to operate the power generation device with the second output value so that the drive gear rotates in the forward direction while the door is in the closed position.

7. The refrigerator according to claim 6, wherein the controller is configured to rotate the power generation device forward with the first output value so that the power is transmitted from the drive gear to the pressure device, based on the door opening signal.

8. The refrigerator according to claim 7, wherein the controller is configured to operate the power generation device with the first output value so that the power is transmitted from the drive gear to the rotary gear after the door is spaced apart from the main body by the pressure device.

9. The refrigerator according to claim 1, wherein the pressure device comprises:
- a slide member configured to be able to move in a longitudinal direction by interacting with the power transmission device; and
- a pressure member provided at a first end of the slide member and configured to rotate by movement of the slide member to press the main body.

10. The refrigerator according to claim 9, wherein the pressure device further comprises an elastic member provided at a rotation shaft of the pressure member, and configured to return the slide member and the pressure member.

11. The refrigerator according to claim 9, wherein the pressure device further comprises a power conversion member provided at a second end of the slide member opposite the first end of the slide member, and configured to transmit the power of the power transmission device to the slide member.

12. The refrigerator according to claim 11, wherein the power conversion member is configured to transmit the power to the slide member when the power generation device rotates in a forward direction.

* * * * *